US008955664B2

(12) United States Patent
Lim et al.

(10) Patent No.: US 8,955,664 B2
(45) Date of Patent: Feb. 17, 2015

(54) BELT CONVEYOR SYSTEM

(71) Applicant: Pteris Global Ltd., Singapore (SG)

(72) Inventors: Kok Leng Lim, Singapore (SG); John Hee Kwee Sng, Singapore (SG)

(73) Assignee: Pteris Global Ltd., Singapore (SG)

( * ) Notice: Subject to any disclaimer, the term of this patent is extended or adjusted under 35 U.S.C. 154(b) by 108 days.

(21) Appl. No.: 13/726,597

(22) Filed: Dec. 25, 2012

(65) Prior Publication Data
US 2013/0105275 A1 May 2, 2013

Related U.S. Application Data

(63) Continuation-in-part of application No. 13/169,054, filed on Jun. 27, 2011, now Pat. No. 8,733,534.

(60) Provisional application No. 61/580,301, filed on Dec. 26, 2011, provisional application No. 61/358,941, filed on Jun. 28, 2010.

(51) Int. Cl.
*B65G 47/46* (2006.01)
*B65G 47/64* (2006.01)

(52) U.S. Cl.
CPC ............ *B65G 47/644* (2013.01); *B65G 47/648* (2013.01)
USPC .................................... 198/369.5; 198/370.1

(58) Field of Classification Search
USPC ........... 198/369.1, 369.5, 861.6, 457.03, 587, 198/370.01, 370.1, 371.2, 435, 839
See application file for complete search history.

(56) References Cited

U.S. PATENT DOCUMENTS

| 509,386 | A | | 11/1893 | Muller |
| 3,061,075 | A | | 10/1962 | Wise |
| 3,982,625 | A | | 9/1976 | Wentz et al. |
| 4,887,708 | A | | 12/1989 | Brown et al. |
| 5,188,210 | A | * | 2/1993 | Malow ........................ 198/369.5 |
| 5,988,362 | A | | 11/1999 | Nakamura et al. |
| 6,360,869 | B1 | | 3/2002 | Itoh et al. |
| 6,958,452 | B2 | | 10/2005 | Takahashi |
| 7,040,456 | B2 | | 5/2006 | Ach et al. |
| 7,267,518 | B2 | | 9/2007 | Kinzer |
| 8,016,101 | B2 | | 9/2011 | Hishinuma |

FOREIGN PATENT DOCUMENTS

| JP | 60082524 | 5/1985 |
| JP | 2009029620 A | 2/2009 |
| WO | 2009001556 | 12/2008 |

* cited by examiner

*Primary Examiner* — James R Bidwell
(74) *Attorney, Agent, or Firm* — Horizon IP Pte Ltd

(57) ABSTRACT

A junction conveyor is disclosed. The junction conveyor includes a stationary end and a switching end. A stationary assembly is disposed at the stationary end and a switching conveyor assembly disposed at the switching end. The junction conveyor includes a counter conveyor assembly between the stationary and switching conveyor assemblies. The junction conveyor includes a counter movement unit. The counter movement unit causes the counter conveyor assembly to move in an opposite direction as the switching conveyor assembly during switching from a home position to a switch position.

26 Claims, 24 Drawing Sheets

BELT CONVEYOR SYSTEM

CROSS REFERENCE TO RELATED APPLICATIONS

This application claims benefit of U.S. Provisional Application Ser. No. 61/580,301, filed on Dec. 26, 2011 and is a continuation-in-part application of U.S. patent application Ser. No. 13/169,054, filed on Jun. 27, 2011, now U.S. Pat. No. 8,733,534, which claims benefit of U.S. Provisional Application Ser. No. 61/358,941 filed on Jun. 28, 2010, which are herein incorporate by reference in their entireties.

BACKGROUND

Belt conveyor systems, such as those used in airports to handle baggage or parcels and in industrial facilities to move products, typically include a "junction" for distributing or sorting the articles being transported from one conveyor to another. The distributing and/or sorting may be accomplished using diverters that have arms that are pivotably mounted at the side or adjacent to the conveyor to move articles to branch conveyors. However, the use of such diverters have the disadvantage that fragile articles may be damaged due to the impact of the push-arm, and smaller articles may be caught or wedged in the clearance between the lower edge of push-arm and upper surface of the transport belt.

Alternatively, the belt conveyor system may use a movable conveyor for distributing or diverting the articles being transported onto stationary conveyors. For example, some systems use a pneumatic cylinder and rods to pivot the transport surface of the moveable conveyor. The pneumatic cylinder is applied as an actuator and needs an air compressor and tank to drive it. Other systems use an AC drive motor and transmission mechanism to pivot the transport surface. Such conventional distributing conveyors systems are mechanically complex with many components that are subject to wear and tear.

In addition, to increase the throughput of the articles, it is desirable to have the belt conveyor system operate at high speeds. However, the faster the conveyors are operated, the greater the equipment vibrates, further increasing the wear and tear, and also producing higher noise levels during operation. Conventional distributing conveyors also do not have designs that allow for modification to accommodate different system configurations.

Accordingly, there is a need for belt conveyor systems with distributing units that have fewer components, have modular components that can be interchanged, and are capable of operating smoothly and quietly at high speeds when switching between predetermined positions.

SUMMARY

Embodiments generally relate to belt conveyor system. In one embodiment, a junction conveyor is presented. The junction conveyor includes a stationary end and a switching end. A stationary assembly is disposed at the stationary end and a switching conveyor assembly disposed at the switching end. The junction conveyor includes a counter conveyor assembly between the stationary and switching conveyor assemblies. The junction conveyor includes a counter movement unit. The counter movement unit causes the counter conveyor assembly to move in an opposite direction as the switching conveyor assembly during switching from a home position to a switch position.

The embodiments, along with their advantages and features herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessary to scale, because the emphasis is generally being placed upon illustrating the principles of the invention. In the description below, various embodiments of the present invention are described with reference to the following drawings, in which.

DETAILED DESCRIPTION

The embodiments generally relate to a belt conveyor system. The belt conveyor system, called a Flexible Horizontal Conveyor, may be used in many applications, including, but not limited to, airport handling systems for baggage and parcels, industrial production lines for moving and sorting various articles, and other similar uses. The belt conveyor system will have multiple units, including a distributing belt conveyor, for directing the articles to and from multiple locations.

The distributing belt conveyor is able to perform several functions including: 1) be placed at a confluence of a transportation line to merge the articles into the transportation mainstream by being positioned at either the home position or divert position; 2) be placed at a confluence of a transportation line to divert the articles into the branch stream with assistance of other equipments (e.g. arm pusher) by being positioned at the divert position; 3) to sort the articles from the upstream, in-feed trunk conveyor into two or more downstream branch conveyors by switching between the home position and different divert positions, respectively; and 4) to merge articles from the two or more upstream branch conveyors into one main transportation stream.

The following description sets forth, without limitation, the various embodiments of the belt conveyor system and, in particular, the distributing belt conveyor, as shown in the accompanying figures.

Figure 1:
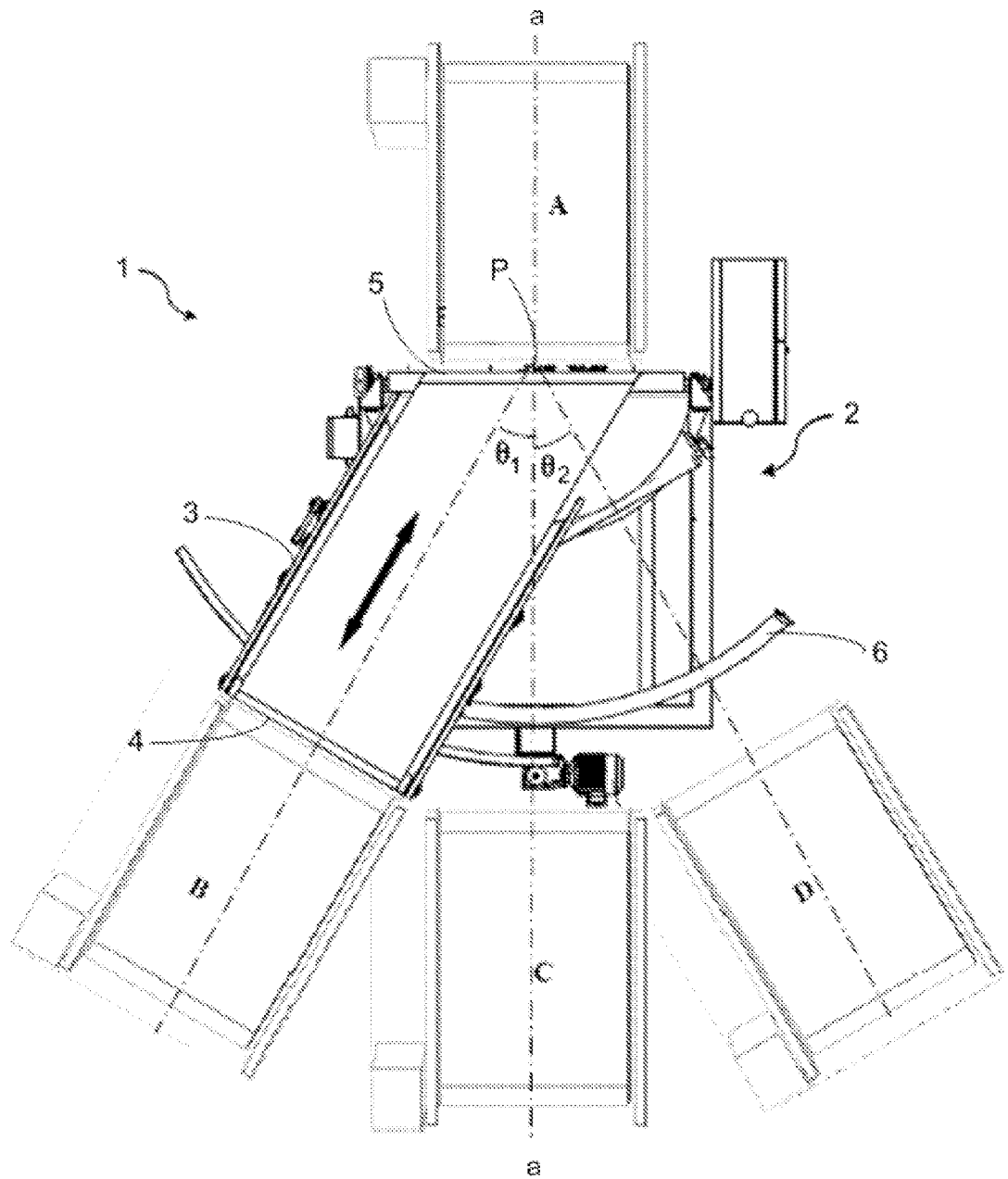
FIG. 1 is a plan view of an embodiment of a belt conveyor system.

As shown in FIG. 1, an embodiment of the belt conveyor system 1 includes a trunk stationary belt conveyor A, a distributing belt conveyor 2 and three branch stationary belt conveyors B, C and D. The belt conveyor system is able to move articles to and from multiple locations. Accordingly, the stationary belt conveyors A, B, C and D, as well as distributing belt conveyor 2, can be operated bi-directionally to transport the articles.

The distributing belt conveyor 2 employs a movable main conveyor assembly 3 with a movable end 4 and a stationary end 5, which are aligned, respectively, with the stationary belt conveyors. Located at the stationary end 5 is the pivot point P, which is the vertex for the angles $\theta_1$ and $\theta_2$ (as measured from the centerline a-a), for positioning the main conveyor assembly 3 in alignment with the two branch stationary belt conveyors B and D. The linear alignment along the centerline a-a with the stationary belt conveyor C is considered in a "neutral" or "home" position. The main conveyor assembly 3 operates by switching between the branch stationary belt conveyors, with the movable end 4 following an arc-shaped path about the pivot point P travelling along a roller guide 6. When three branch stationary belt conveyors are used, the angles $\theta_1$ and $\theta_2$ may be the same or different depending on the layout of the belt conveyor system 1. The angles may be pre-determined to permit automated positioning of the main conveyor assembly 3.

Figure 1A:
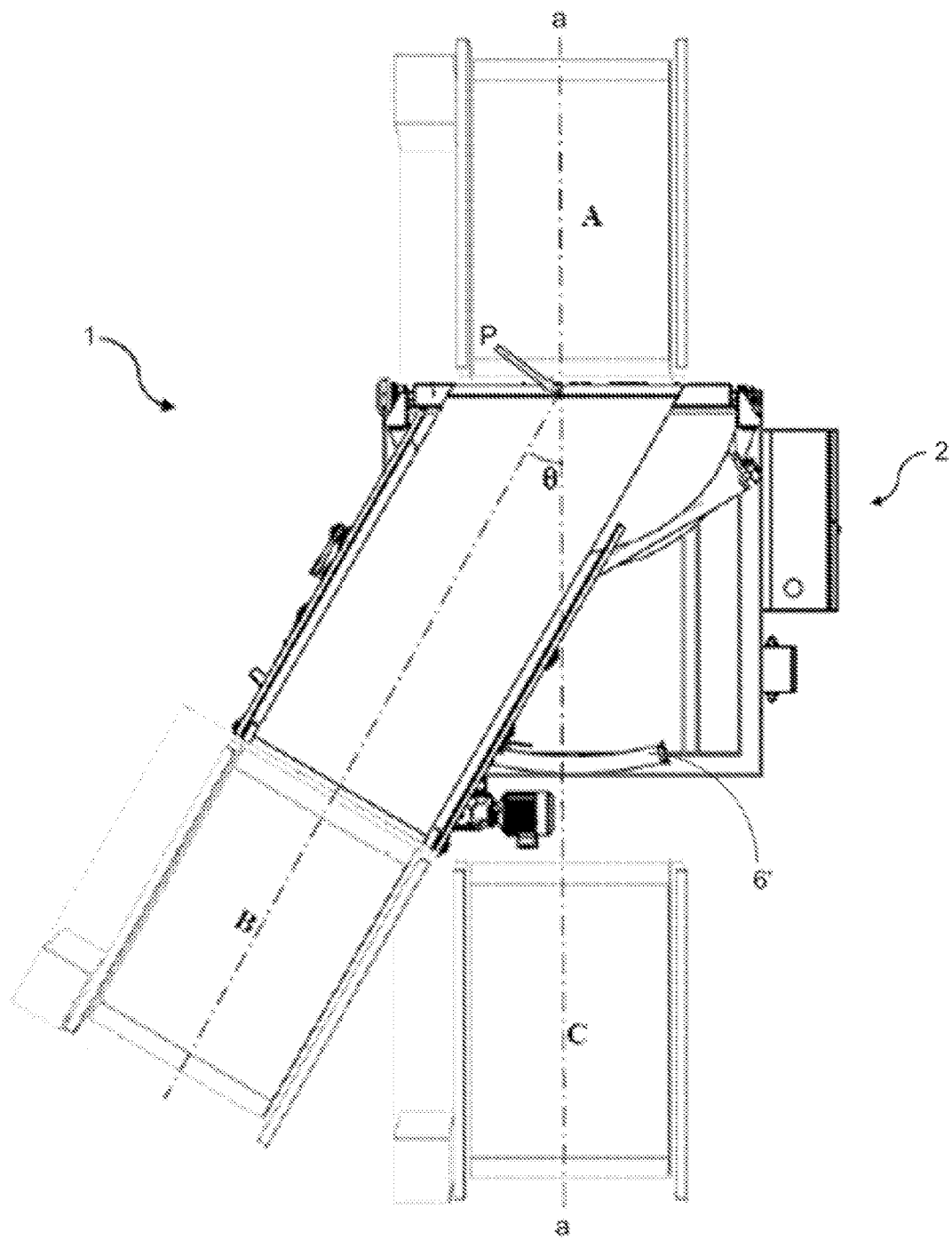
FIG. 1a is a plan view of another embodiment of a belt conveyor system.

In one embodiment, there are at least two branch stationary belt conveyors. FIG. 1a shows an embodiment of the belt conveyor system that is configured for only two branch stationary belt conveyors, B and C. In this configuration, the distributing conveyor unit may be modified; for example, the roller guide 6' can be shorter. It is within the scope of this disclosure to have more than three branch stationary belt conveyors, depending on the width of the main conveyor assembly and the width of the branch stationary belt conveyors.

Figure 2:
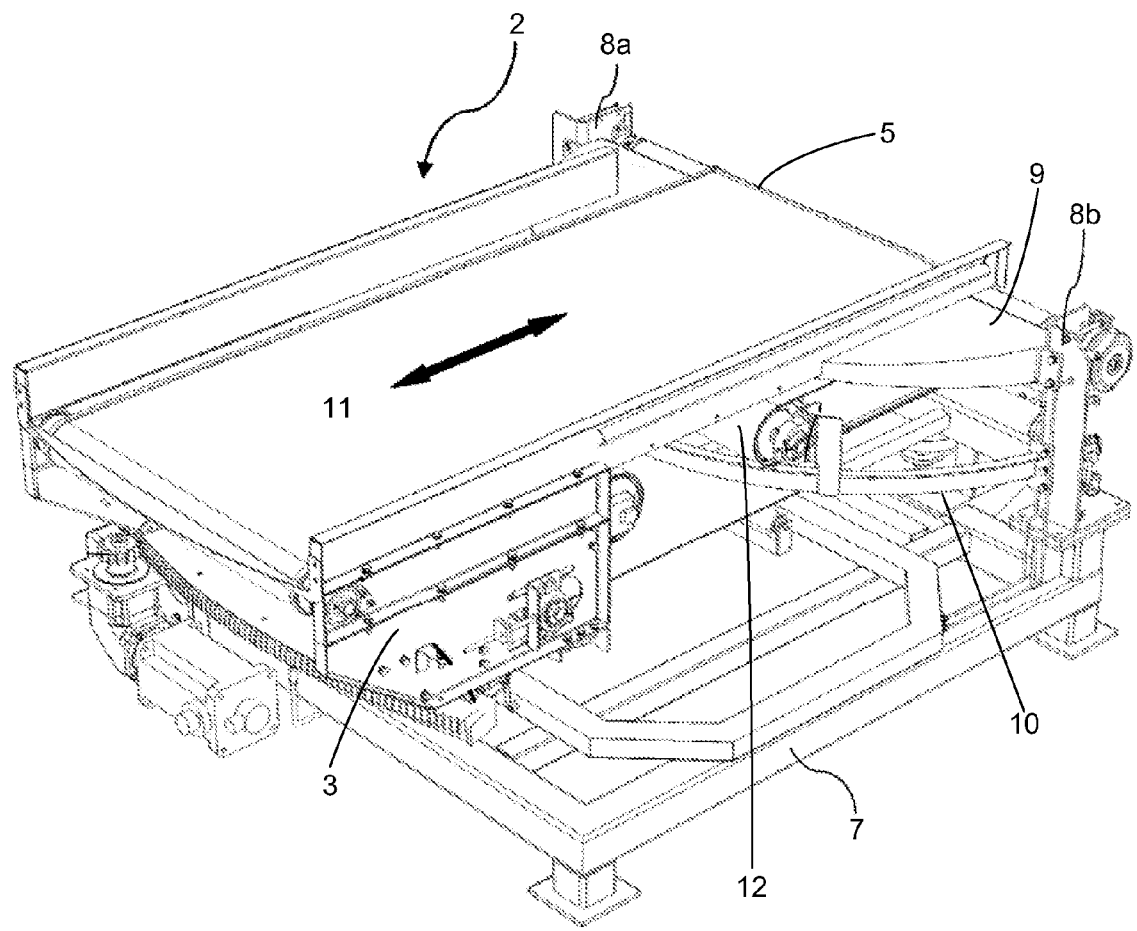
FIG. 2 is a perspective view of an embodiment of a distributing belt conveyor.

As shown in FIG. 2, this embodiment of the distributing belt conveyor 2 includes the movable main conveyor assembly 3 and a movable counter assembly 12, which are supported by a base frame 7. The main conveyor assembly moves in opposition to the movement of the counter assembly, which enables a belt 11 to track smoothly. The belt 11, for example, may include an endless belt, a lacing belt or a zip belt. Other types of belt may also be used. The main conveyor assembly and the counter assembly are shown in an aligned neutral position. The base frame 7 has vertical frames 8a and 8b at the stationary end 5. The base frame is wider than the main conveyor assembly to provide greater stability, and together with the vertical frames, is the main support for the distributing belt conveyor unit 2.

In a preferred embodiment, a horizontal frame 9 is shown in FIG. 2 as an arc-shaped, semi-circular structure. The vertical frames 8a and 8b support the horizontal frame 9, which is attached proximally to the tops of the vertical frames. The horizontal frame provides support at the stationary end 5 for the main conveyor assembly 3 and for the belt 11. The arc-shape may be correspondingly fitted to slidably engage the main conveyor assembly. It is within the scope of this disclosure to have alternative embodiments for the semi-circular, solid surface shown for horizontal frame 9; for example, the surface may be slats, a lattice or a mesh surface in place of a solid surface, and an arc-shape smaller than a semi-circle or other suitable shape may be used.

A guide track 10 is shown in FIG. 2 as an arc-shaped, semi-circular structure. The guide track supports the movement of the counter assembly 12. The vertical frames 8a and 8b also support the guide track 10, which is attached below the horizontal support 9. The shape of the guide track 10 can be varied, provided it is able to support the movement of the counter assembly, and will depend, in part, on the length of the counter assembly. It is preferred that at least that portion of the guide track 10 supporting the movement of the counter assembly 12 be an arc-shape.

Figure 3:
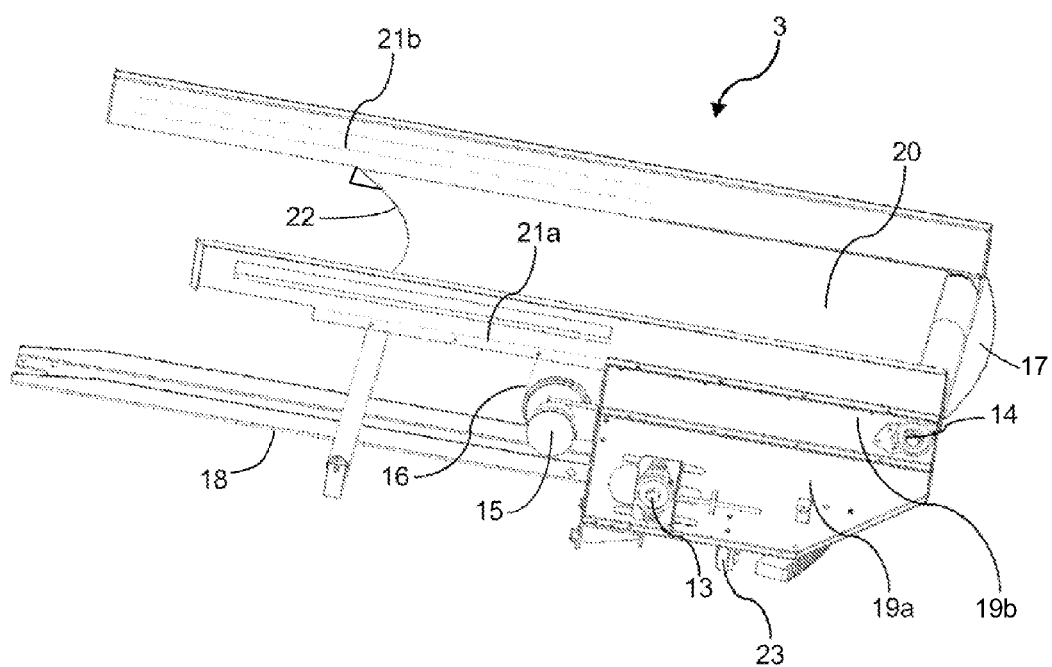
FIG. 3 is a perspective view of an exemplary main conveyor assembly of the distributing belt conveyor.

As shown FIG. 3, the main conveyor assembly 3 includes a take-up pulley 13, a tail pulley 14, and a drive pulley 16. The take-up pulley, tail pulley and drive pulley are axially mounted parallel to each other on the frame of the main conveyor assembly. The take-up pulley is adjustably mounted to allow for tightening and loosening of a belt and can be removed when the belt needs to be replaced. Located near the tail pulley 14 is an extension 17, which serves to bridge the gap between the distributing belt conveyor and the branch stationary belt conveyors.

In the embodiment shown in FIG. 3, a belt drive motor 15 is attached to the drive pulley 16 and is a drum-type motor. It is within the scope of this disclosure for the drive pulley to be motorized by either a direct method, using a drum motor or shaft mounted motor, or an indirect method, using a timing belt coupled with switching drive motor that is horizontally mounted on the main conveyor assembly 3.

The main conveyor assembly 3 includes a main frame connector 18 and at least one caster wheel 23 that is attached to the underside of the main conveyor assembly. The caster wheel travels on the roller track 6, as it supports the weight of main conveyor assembly during the switching movement about pivot point P. The upper surface of roller track 6 is preferably rubberized for noise reduction. The main conveyor assembly 3 is also provided with two side frames that are removable for maintenance, including the replacement of the belt. In one preferred embodiment, each side frame is divided into two removable parts 19a and 19b, which permits the take-up pulley 13 or the tail pulley 14 to individually serviced without the need to disturb the other pulley.

The upper portion of the main conveyor assembly 3 is provided with a horizontal belt support 20 and side guards 21a and 21b. The horizontal belt support and side guards accommodate the contour of the horizontal frame 9 to allow the main conveyor assembly to move smoothly. It is also preferred that the upper surfaces of the horizontal belt support 20 and the horizontal frame 9 are leveled to be in the same horizontal plane, thereby permitting the transported articles to travel smoothly on the belt, and that edge 22 of horizontal belt support is shaped to correspond closely with the horizontal frame 9. Alternative embodiments for the horizontal belt support 20 may include a frame with rollers, slats, a lattice or mesh surface rather than a solid surface.

The side guards 21a and 21b are positioned to move over the horizontal frame 9 with minimal or no friction. In addition, the lengths of the side guards can be the same or different depending on the number of branch stationary belt conveyors. For example, if only two branch stationary belt conveyors are present, and positioned as B and C as shown in FIG. 1a, it can be advantageous to have side guard 21b longer than side guard 21a. However, if the two branch stationary belt conveyors are positioned as C and D, as shown in FIG. 1, it can be advantageous to have side guard 21a longer than side guard 21b.

Figure 4:
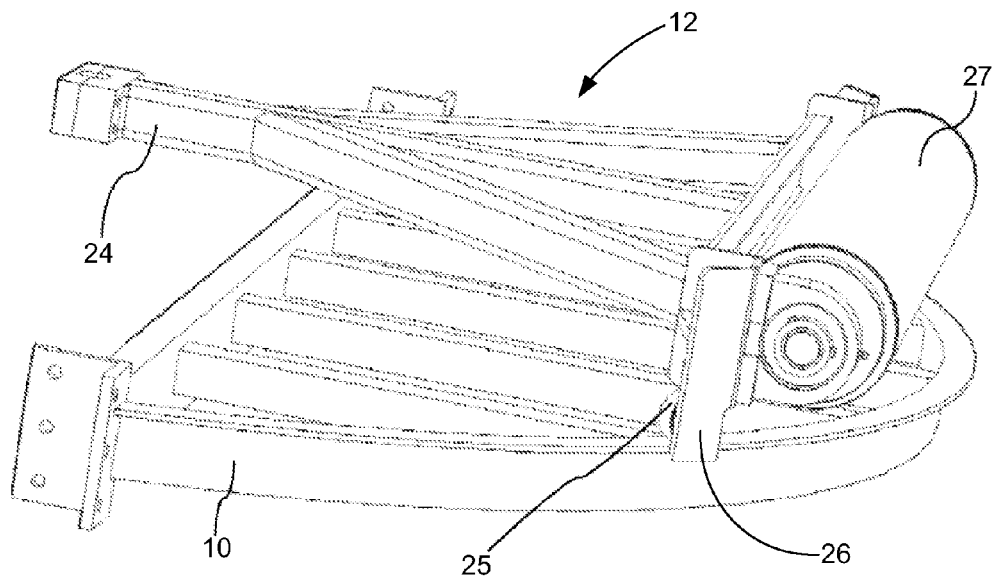
FIG. 4 is a perspective view of an exemplary counter assembly of the distributing belt conveyor.

As shown in FIG. 4, the counter assembly 12 is provided with a counter frame connector 24, bearing wheel 25, wheel support 26 and counter pulley 27. The counter assembly is supported by at least one bearing wheel, which moves on guide track 10. When one bearing wheel is used, the bearing wheel and wheel support is preferably located near the center of the counter pulley (not shown) to provide better weight distribution. In a preferred embodiment having two wheel supports positioned on the sides of the counter pulley 27, the counter assembly 12 will have at least two bearing wheels. It is preferred that the bearing wheels 25 be made of a polymeric material, which will enable smooth movement on the guide track and reduced noise.

Figure 4A:
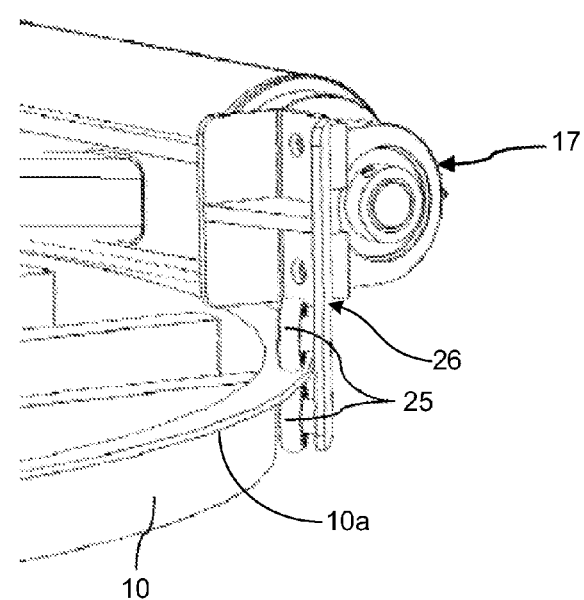
FIG. 4a is an exploded perspective view of a section of the counter assembly.

As shown in FIG. 4a, another preferred embodiment provides a wheel support 26 on both sides of the counter pulley 27, with each wheel support having upper bearing and lower bearing wheels 25. The guide track 10 is provided with a flange portion 10a that is engaged between the upper and lower bearing wheels. In this arrangement, the bearing wheels prevent the counter pulley from disengaging from the guide track.

Figure 5:
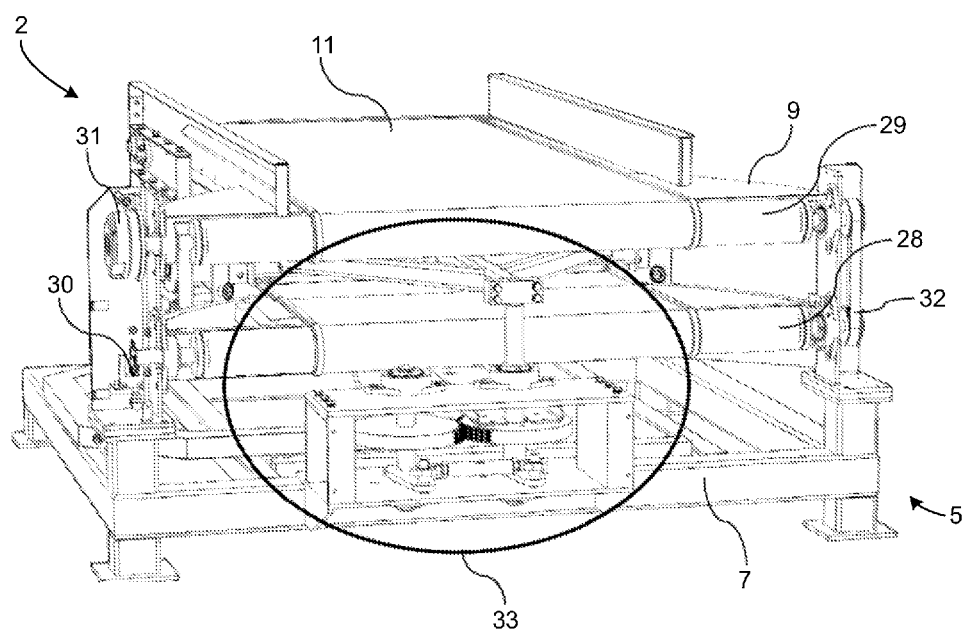
FIG. 5 is a perspective view of an exemplary switching gear unit of the distributing belt conveyor.

As shown in FIG. 5, the distributing belt conveyor 2 is provided with two long end pulleys, the lower long end pulley 28 and upper long end pulley 29, and a switching gear unit 33, which are positioned at the stationary end 5. The lower long end pulley 28 and upper long end pulley 29 are mounted parallel to each other. The long end pulleys 28 and 29 rotate when the main conveyor assembly is in the "home" position. When the main conveyor assembly is in a "diverted" position, as shown in FIG. 1, both long end pulleys are kept stationary to allow the belt to more easily stay on track. In one embodiment, to keep the long end pulleys stationary, an encoder 30 and brake mechanism 31 are provided at the ends of the long end pulleys, while the other ends of long end pulleys are coupled with a timing belt 32. The brake mechanism may be placed on either the upper or the lower long end pulley.

Figure 5A:
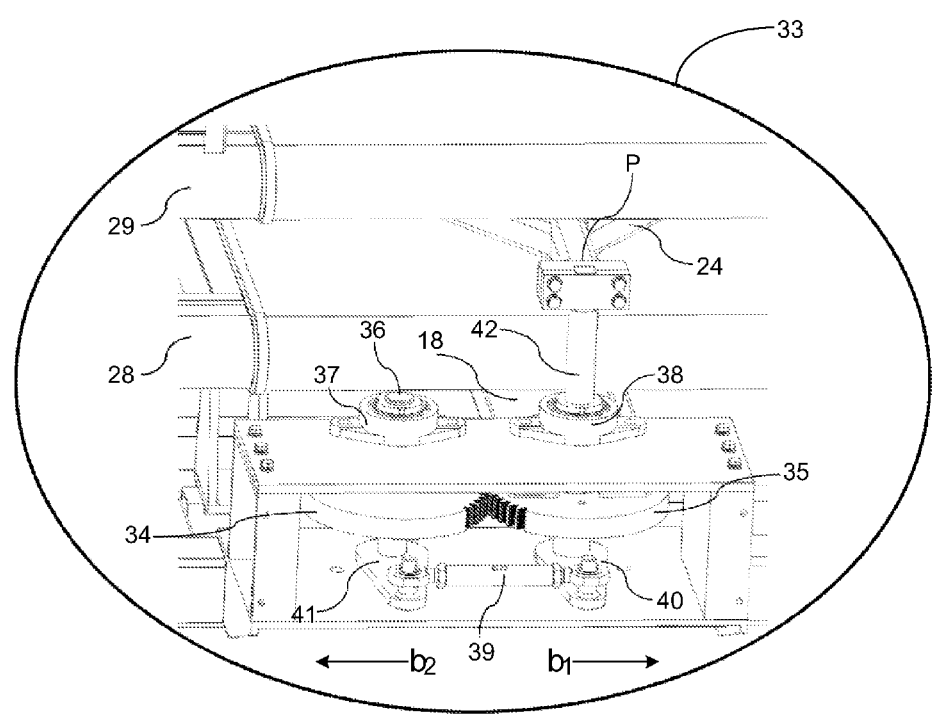
FIG. 5a is an exploded perspective view of the switching gear unit.

The movements of the main conveyor assembly 3 and the counter assembly 12 are synchronized using a switching gear unit 33, or "reverse" gear unit. As shown in FIG. 5a, the switching gear unit 33 is provided with a counter gear 34, a main gear 35, a counter shaft 36, four flanged mounted bearings (only the top flanged mounted bearings 37 and 38 are shown), at least one eye-turned buckle 39, two welded plates 40 and 41, and a main shaft 42, which embodies the pivot point P. The remaining two flanged mounted bearings are positioned at the underside of the switching gear unit 33 near the bottom ends of counter shaft 36 and main shaft 42.

The main frame connector 18 is coupled to main gear 35, which enables the synchronized movement. The main gear 35 has bearings (not shown) inside and these bearings permit rotation on the main shaft 42, i.e., each moves independently. The counter frame connector 24 is connected to the top end of the main shaft 24. The main shaft acts as the pivot point P for the movement of both the main conveyor assembly 3 and counter conveyor 12.

The main gear 35 and counter gear 34 are engaged and rotate in opposite directions. The welded plates 40 and 41 are joined by at least on eye-turned buckle 39 and this synchronizes the rotation of main shaft 42 and counter shaft 36. By means of the opposite rotation of the gears and the shaft synchronization, the reverse swinging movement of main conveyor assembly 3 and counter conveyor 12 is achieved.

For example, to align the movable end 4 of main conveyor assembly 3 with the branch stationary belt conveyor B (as shown in FIG. 1), the main frame connector 18 is moved in the direction $b_1$ (as shown in FIG. 5a). As a result, the main gear 35 (which is attached to main frame connector 18) is rotated in a clockwise direction and causes a counter-clockwise rotation of the counter gear 34 and counter shaft 36. Accordingly, the main shaft 42 and the attached counter assembly 12 are rotated in a counter-clockwise direction by the arrangement of the welded plates 40 and 41 and the eye-turned buckle 39. The synchronized reverse swinging movement of main conveyor assembly 3 and counter assembly 12 thereby enable the smooth movement of the belt 11.

For the distributing belt conveyor 2, the belt 11 extending from the upper long end pulley 29 to the tail pulley 14 is the transporting surface for the articles. In one direction of use, the belt is taken downward by the drive pulley 16 and around the take-up pulley 13 towards the lower long end pulley 28. From the lower long end pulley 28, the belt extends around the counter pulley 23, and continues upward to the upper long end pulley and then to the tail pulley 14.

Figure 6:
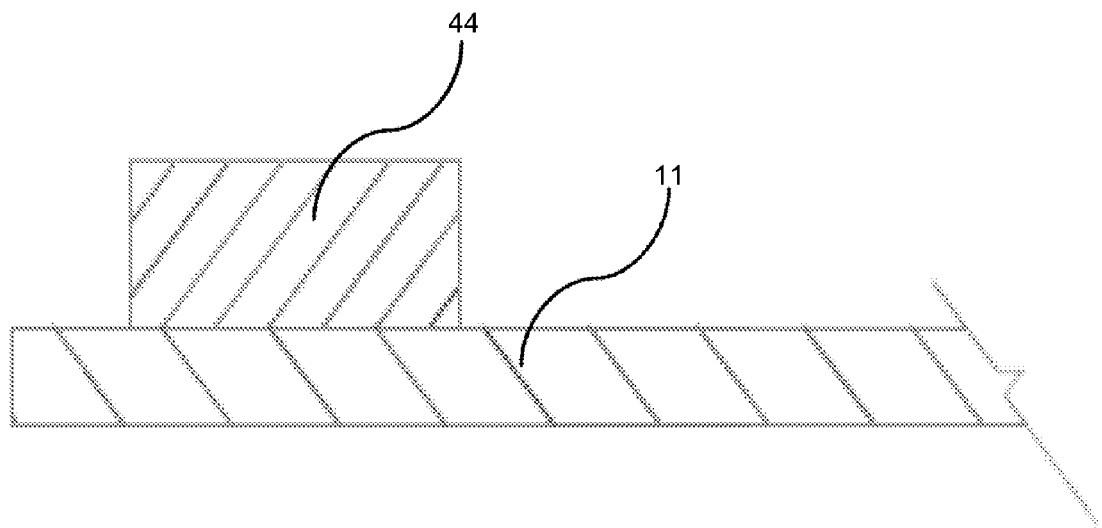
FIG. 6 is a cross sectional view of an exemplary protrusion for a belt.

In a preferred embodiment, the belt 11 is provided with protrusions that are proximal to the outer edges of the upper surface of the belt, which engage the drive and counter pulleys. As shown in FIG. 6, a protrusion 44, which is made of a medium hard belt material, is located proximal to the edge of the belt 11. In another preferred embodiment, the edge protrusion 44 of the belt has cross-sectional shape in the form of a rectangle. It is within the scope of this disclosure and understood that other shapes may be used, including square, semicircular and triangular. In addition, between the protrusions, a roughened upper surface may be used that prevents transported articles from easily sliding off the conveyor, while the lower surface of the belt is smooth.

Figure 7:
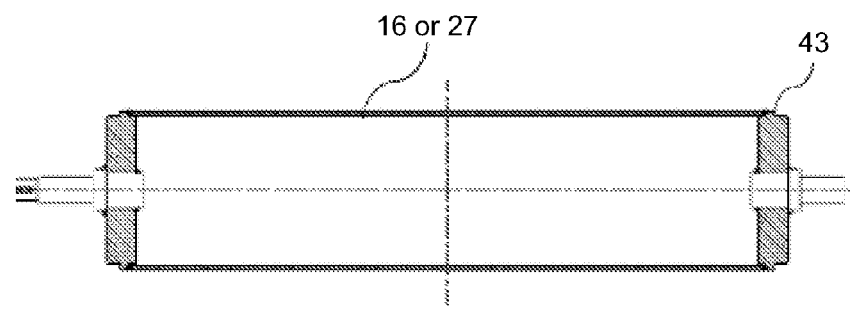
FIG. 7 is a cross sectional views of an exemplary grooved-step profile of the drive pulley and counter pulley.
Figure 7A:
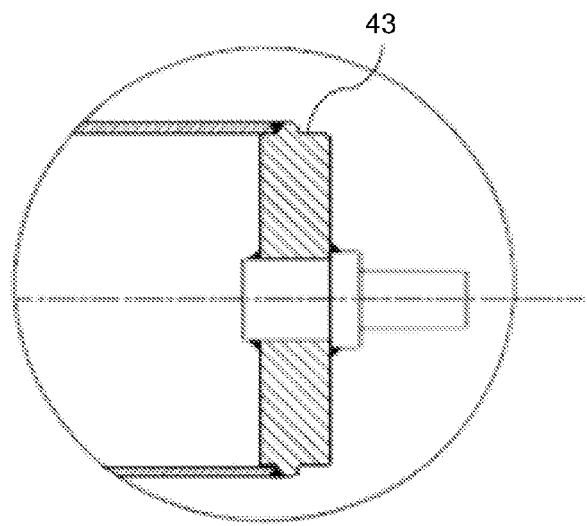
FIG. 7a is an exploded cross sectional view of the grooved-step profile.
Figure 7B:
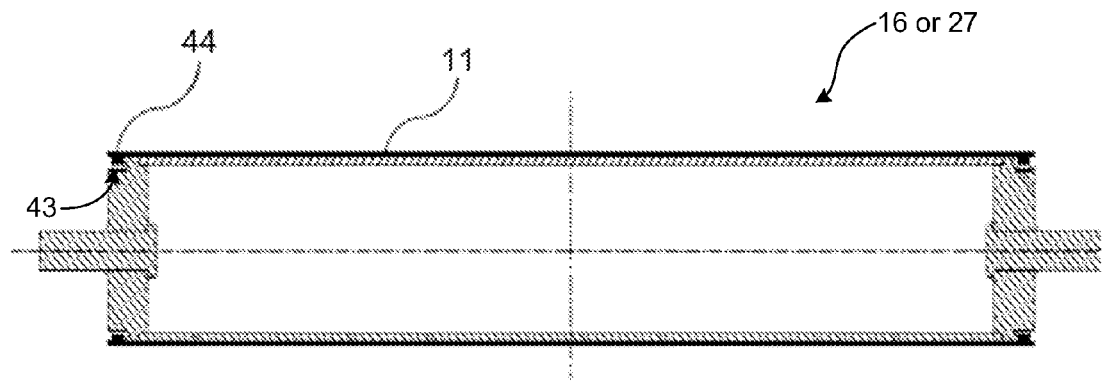
FIG. 7b is a cross sectional view of a belt with an exemplary protrusion engaging the grooved-step profile of a pulley.

As shown in FIGS. 7, 7a and 7b, in this preferred embodiment, the drive pulley 16 and counter pulley 27 are provided with ends that have a grooved-step profile 43. The shape of the groove 43 will correspond with the shape of the protrusion 44 to allow the protrusion to fit inside the grooved-step. This arrangement allows the drive and counter pulleys to more easily maintain the position of the belt and prevents the belt from sliding off the pulleys and to the edges of the conveyor. The corners of grooved-step profile 43 are made smooth to mitigate the tearing of the belt 11.

In one embodiment, the movement or "switching" between the branch stationary belt conveyors is powered by a motorized drive mechanism. The preferred embodiments for the drive mechanism are: a) belt drive mechanisms; and b) gear drive mechanisms.

Figure 8A:
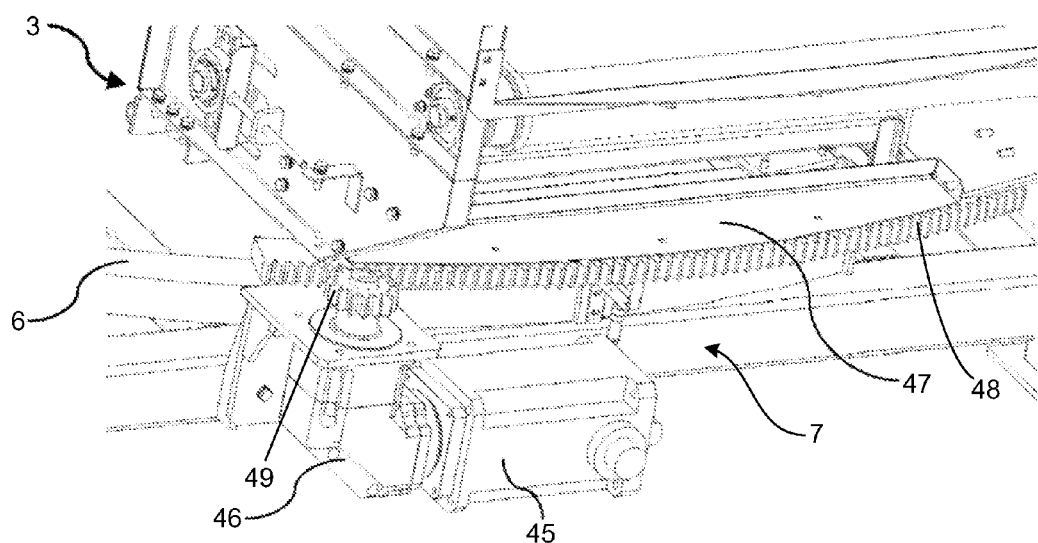
FIG. 8a is a perspective view of an exemplary gear drive mechanism for an embodiment of the distributing belt conveyor unit.

As shown in FIG. 8a, an embodiment of the gear drive mechanism provides a switching drive motor 45, a gearbox 46, arc gear 47 with arc sprockets 48, and a sprocket 49. Switching drive motor 45 is mounted on the base frame 7 under the main conveyor assembly 3. Gearbox 46 attached to switching drive motor 45 can be a right angle or straight type. Arc gear is preferably attached to the underside main conveyor assembly 3. The movement of main conveyor assembly 3 is driven by the operation of the switching drive motor 45 via sprocket 49, as it engages the arc sprocket 48 on the arc gear 47. In another embodiment, the arc gear may be substituted with pins or a chain to engage the sprocket 49.

Figure 8B:
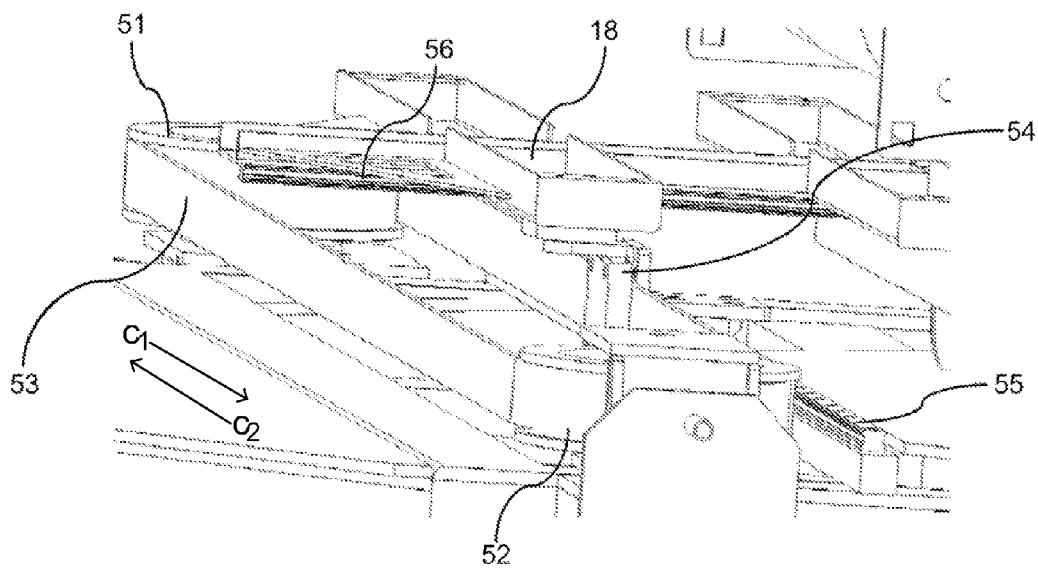
FIG. 8b is a perspective view of an exemplary belt drive mechanism for an embodiment of the distributing belt conveyor unit.

As shown in FIG. 8b, an embodiment of the belt drive mechanism provides a gearbox (not shown), switching drive motor (not shown), two drive pulleys 51 and 52, a timing belt 53, connection block 54 and two linear rails 55 and 56. As with the gear drive mechanism, the switching drive motor and gear box are mounted on the base frame 7. The gearbox attached to the switching drive motor can be a right angle or straight types. The two pulleys 51 and 52 are mounted at the upper surface of base frame 7 and either one of the pulleys may be connected to and driven by the switching drive motor and gearbox. The timing belt 53 is looped around the two pulleys 51 and 52, with the connection block 54 attached firmly on the timing belt 53. The linear rail 55 is mounted on the base frame 7 and is positioned parallel with the section of the timing belt 53 between the pulleys. The linear rail 56 is attached under main conveyor assembly. The connection block 54 is slidably attached to linear rails 55 and 56. The motor 45 drives the movement of connection block 54 as a result of it being coupled to the timing belt 53.

When the pulley 51 or 52 (depending on which pulley is attached with the drive motor) is rotated in clockwise direction, the connection block 54 is driven in the direction $c_1$ by the movement of the timing belt 53. The linear guide rail 56 is pulled by connection block 54 and the main conveyor assembly 3 is swung in the same direction. When the pulley 51 or 52 is rotated in counter-clockwise direction, the main conveyor assembly 3 is swung to the direction $c_2$.

The embodiments provide a distributing belt conveyor unit that is simpler to maintain and service; in particular, the removal of the belt is simplified. To that end, with reference to FIGS. 9, 10 and 10a, it is preferred that the belt removal be performed from the side of the distributing belt conveyor where the timing belt 32 is located.

Figure 9:
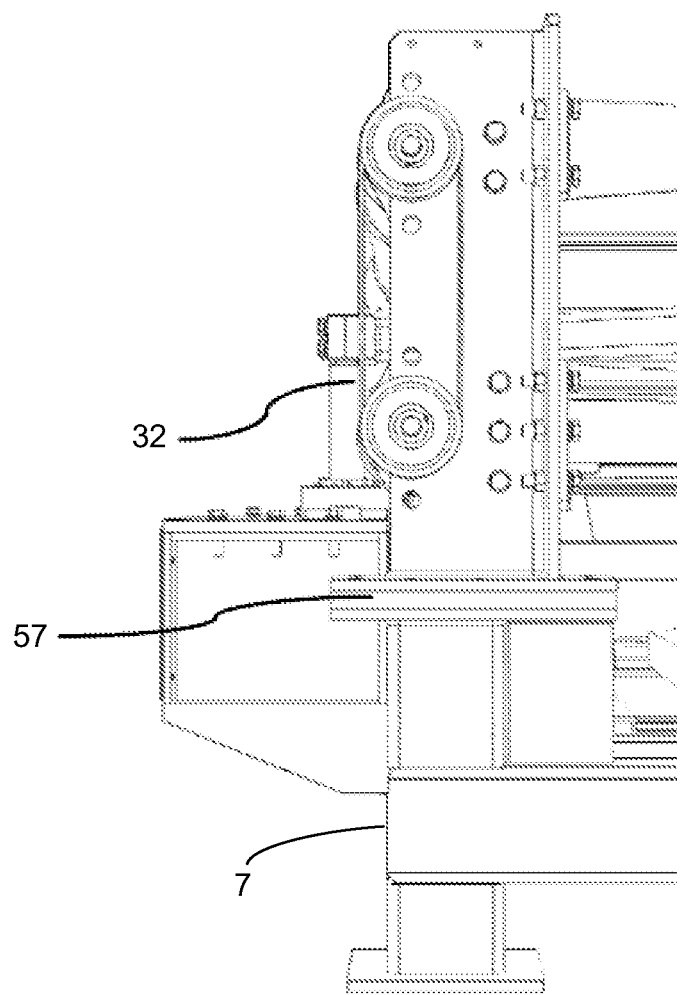
FIG. 9 is a perspective view of a section of an embodiment of the distributing belt conveyor unit showing the vertical frame, spacer and base frame arrangement.
Figure 10:
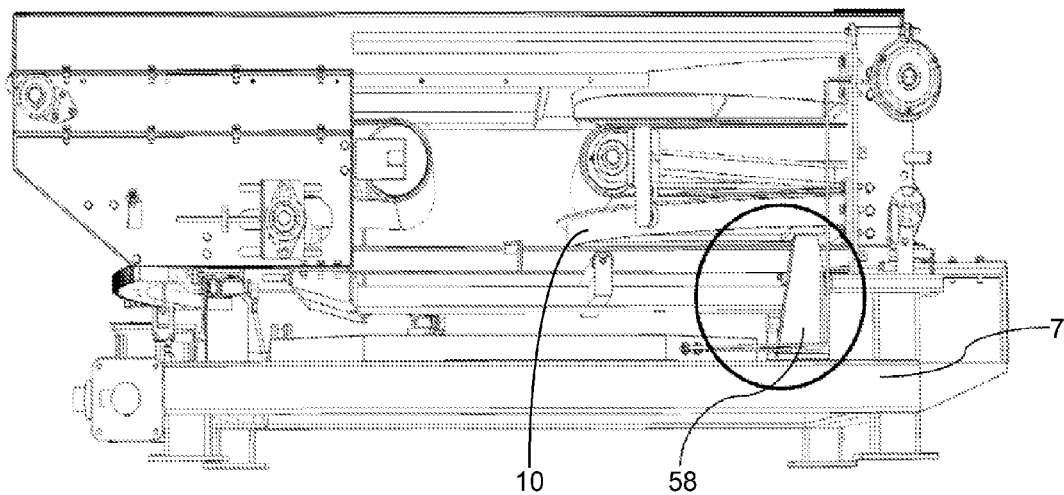
FIG. 10 is a perspective view showing the replacement position of an exemplary belt removal support.
Figure 10A:
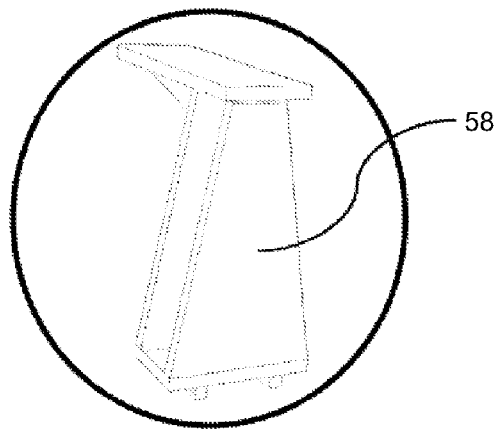
FIG. 10a is an exploded perspective view of the exemplary belt removal support.

To begin, the take-up pulley 13 is loosened and removed, followed by the removal of extension 17 and the main assembly side frames parts 19a and 19b. By removing the take-up pulley, the belt is slackened and the counter pulley 27 can be easily removed by unfastening the counter frame connector 24 from main shaft 42. Thereafter, the belt 11 can be shifted to the side where the timing belt 32 is located. The belt removal support 58, which has an inverted L-shape, as shown in FIG. 10a, is placed on the base frame 7 on the opposite side of the timing belt 32, as shown in FIG. 10. The belt removal support is positioned to permit the remaining pulleys to be left undisturbed in their original positions. Subsequently, the timing belt 32 and the vertical spacer 57, as shown in FIG. 9, are removed. After completing the steps above, the belt 11 can be removed through the openings created by the removal of the side frames parts 19a and 19b and the vertical spacer 57.

Figure 11A:
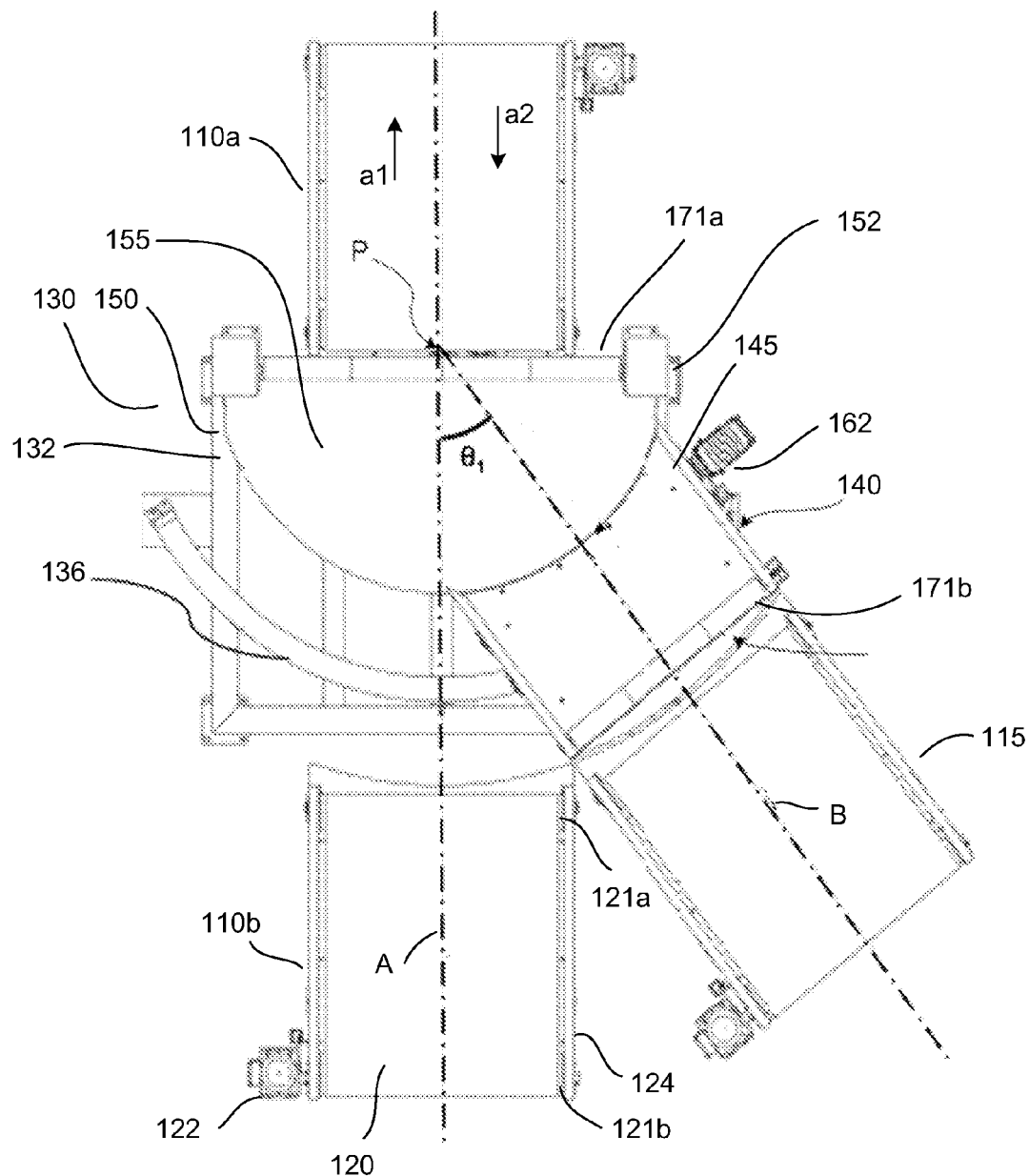
FIG. 11a shows another embodiment of a conveyor system.

FIG. 11a shows another embodiment of a conveyor system 101. As shown, the conveyor system includes a first or main conveyor path A and a secondary or branch conveyor path B in which articles are translated. The secondary conveyor path forms a junction with the first conveyor path. As shown, the first conveyor path is linear, at least the portion at either side of the junction formed by the secondary conveyor path. The conveyor system may operate bi-directionally. For example, the conveyor system may operate in a first direction where the secondary path merges into the main path, as indicated by arrow a1 or in a second direction where the main path may be diverted to the secondary path, as indicated by arrow a2. The paths, along a direction of travel, form a travel angle $\theta_1$ of less than or equal to about 45°. The travel angle, for example, may be from about 25-45°. Providing other travel angles may also be useful.

A junction or distributing conveyor 130 is disposed at the junction between the main and secondary paths. First and second main conveyor units 110a-b are disposed on first and second sides of the junction conveyor. Depending on the direction of travel, one side is the downstream side and the other is the upstream side. For example, for traveling in the first direction, the first side is the downstream side and the second side is the upstream side. A secondary conveyor unit 115 is disposed on the second side of the junction conveyor.

A conveyor unit, for example, includes a conveying surface formed by an endless belt 120 around end pulleys 121a-b. One of the end pulleys may be a drive pulley connected to a motor 122 for rotating the endless belt. The motor may be directly connected to the drive pulley. For example, a drum motor or shaft mounted geared motor may be directly coupled to the drive pulley. In other embodiments, the motor may be indirectly connected to the drive pulley. The pulleys and motor may be mounted on a conveyor frame 124. Other configurations of conveyor units may also be useful. The pulleys, for example, are mounted with its axis of rotation perpendicular to the direction of travel.

The junction conveyor includes a base frame 132 on which a junction conveyor system is mounted. The base frame includes a first end adjacent to the first side of the junction conveyor and a second end adjacent to the second side of the junction conveyor. The junction conveyor system includes a pulley system through which a conveyor belt loops to form a junction conveyor surface 160. In one embodiment, the first side of the junction conveyor is a stationary side. For example, the first end of the junction conveyor surface maintains alignment with the conveyor surface of the first main unit. The second side is the switching side. For example, the second end of the junction conveyor surface switches to be in alignment between the conveyor surfaces of the second main conveyor unit and the secondary conveyor unit. In one embodiment, the junction conveyor system includes a stationary assembly, a junction counter conveyor assembly 150 and a junction switching conveyor assembly 140. The switching conveyor assembly along with the stationary assembly may be considered as the main assembly. The reference to the main assembly may be to the stationary assembly and/or switching assembly.

The stationary assembly is disposed proximate to the first end of the base frame and forms the stationary side of the junction conveyor. The stationary assembly includes a stationary support frame 152. In one embodiment, the stationary support frame includes first and second vertical support frames fixably mounted on the base frame. The vertical support frames are maintained at a fixed spatial distance. The spatial distance of the vertical support frames is wider than the conveyor surface. A first end pulley 171a of the junction pulley system is mounted to the vertical sides of the counter support frame. The first end pulley 171a is mounted so that it is parallel to the end pulley of the first main conveyor unit. For example, the first end pulley is mounted perpendicularly to the direction of travel of the first main conveyor unit. The first end pulley defines a stationary end of the junction conveyor surface. In one embodiment, a lower end pulley 1373 may be mounted on the vertical support frames below the first end pulley. The lower end pulley has its axis of rotation parallel to and in vertical registration with the first end pulley. In one embodiment, a first slider bed 155 is mounted on the vertical frames. The first slider bed, for example, may be referred to as the stationary slider bed of the stationary assembly. The first slider bed, in one embodiment, is semicircular in shape and is mounted to the vertical support frames. The non-semicircular portion is proximate to the stationary end of the junction conveyor while the semicircular portion is distal from the stationary end of the junction conveyor. The semicircular portion is adjacent to the switching conveyor assembly.

A counter track 1378 is mounted on the vertical frame. A counter bend pulley unit 1560 is provided. The counter bend pulley unit includes a counter bend pulley support on which the counter bend pulley 1568 is mounted. The counter bend pulley rotates around a pivot point P, facilitated by the counter track. The counter track and counter bend pulley unit, for example, form the counter conveyor assembly 150.

As for the switching conveyor assembly 140, it has a switching support frame which is movably mounted to the base frame. The switching support frame includes a second slider bed 145 mounted thereon. The second slider bed, for example, may be referred to as the main or switching slider bed. The switching slider bed, in one embodiment, includes a semicircular end which is configured to slidabley mate with the semicircular portion of the first slider bed. The non-semicircular end is disposed proximate to the second side of the junction conveyor. A second end pulley 171b of the junction pulley system is mounted on the switching support frame. The second end pulley is mounted so that it is perpendicular to the direction of travel of the junction conveyor surface. The second end pulley defines a second or switching end of the junction conveyor surface.

In one embodiment, a drive pulley 1476 is mounted on the main or switching support frame. The drive pulley is mounted in a parallel configuration with the second end pulley. A motor 162 is coupled to the drive pulley for rotating it to drive the endless belt. The motor may be directly connected to the drive pulley. For example, a drum motor or shaft mounted geared motor may be directly coupled to the drive pulley. In other embodiments, the motor may be indirectly connected to the drive pulley. The pulleys and motor may be mounted on the main support frame.

The switching conveyor assembly also includes a switching or main track 136 which is mounted on the base frame. The track is mounted proximate to the second end of the base frame. In one embodiment, the track is a semicircular track. The switching conveyor assembly is slidably coupled to the track. The switching conveyor assembly pivots about the pivot point P while moving along the track. The pivot point, for example, is located at the first end of the junction conveyor at about the center of the first main conveyor surface. The track enables the main junction conveyor to pivot at least the travel angle $\theta_1$. In one embodiment, the track enables the main junction conveyor to pivot at least $\pm\theta_1$. Providing the track which enables the main junction conveyor to pivot at other angles may also be useful. For example, the track enables the main junction conveyor assembly to be flexibly positioned anywhere within the track.

In one embodiment, the main or switching conveyor assembly can oscillate or switch between a first and a second position. Moving the switching conveyor assembly from one position to another may be referred to as "switching" or "switching operation". Other similar terms may also be used. The first position may be a home or neutral position and the second position may be a divert/merge (D/M) position. In the home position, the support frame is aligned with the second main conveyor unit. On the other hand, the support frame is aligned with the secondary conveyor unit in the D/M position. By pivoting the switching conveyor assembly, the junction conveyor surface is flexibly aligned with the conveyor surfaces of the main and secondary conveyor units.

A translating unit 1380 facilitates in moving the switching conveyor assembly. For example, the translating unit includes a motor and drive components for moving the switching conveyor assembly. In one embodiment, a counter movement (CM) module is provided. The CM module reduces vibration caused by moving the switching conveyor assembly. The CM module is used to transmit the movement of the switching conveyor assembly to the counter conveyor assembly oppositely and to absorb the vibration and impact generated by the switching operation from one position to another. In one embodiment, the CM module reduces the moment of inertia of the switching conveyor assembly. For example, the CM module causes counter conveyor assembly to rotate at the pivot point P in a counter direction to the switching conveyor assembly.

The CM module may include a reverse gear, a timing pulley and a belt adapted to reduce the moment of inertia of the main or switching conveyor assembly. Providing other components to reduce the moment of inertia of the switching conveyor assembly may also be useful. The CM module enables high speed operation of the junction conveyor and increases reliability.

As described, the first 171a and lower end pulley 1373 of the junction conveyor are mounted on the vertical frames. The first end pulley is on the stationary end of the junction conveyor which is parallel to the first end pulley of the first main conveyor unit. The second end pulley 171b is mounted to the switching end of the junction conveyor. It is mounted perpendicular to the direction of travel of the junction conveyor surface. The direction of travel of the junction conveyor surface is along the direction of either the second main conveyor unit 110b or the secondary conveyor unit 115. As such, the second end pulley is parallel to either the end pulley of the second main conveyor unit or the secondary conveyor unit. This enables the second end of the junction conveyor surface to mate and be aligned with the ends of the second main and secondary conveyor units. The flexible junction conveyor can select the conveyor path on which articles are moved to be along A or along A-B. The motors of the various conveyor units, for example, drive the conveyor surface at the same velocity and in the same direction.

Due to switching, the angle of the second end pulley varies with respect to the first end pulley. For example, in the home position, the end pulleys of the junction conveyor are parallel. However, when the switching conveyor assembly is switched, the angles change to equal to $\theta_1$. The change in angles between the end pulleys may cause the endless belt to go off track. In one embodiment, the pulley system includes crown pulleys to facilitate keeping the endless belt on track, regardless of the change in angles between the end pulleys. Other techniques for maintaining the endless belt on track may also be useful. For example, the first end pulley and or lower end pulley may be braked or non-rotatable when the switching assembly is in a position other than the home position.

Figure 11B:
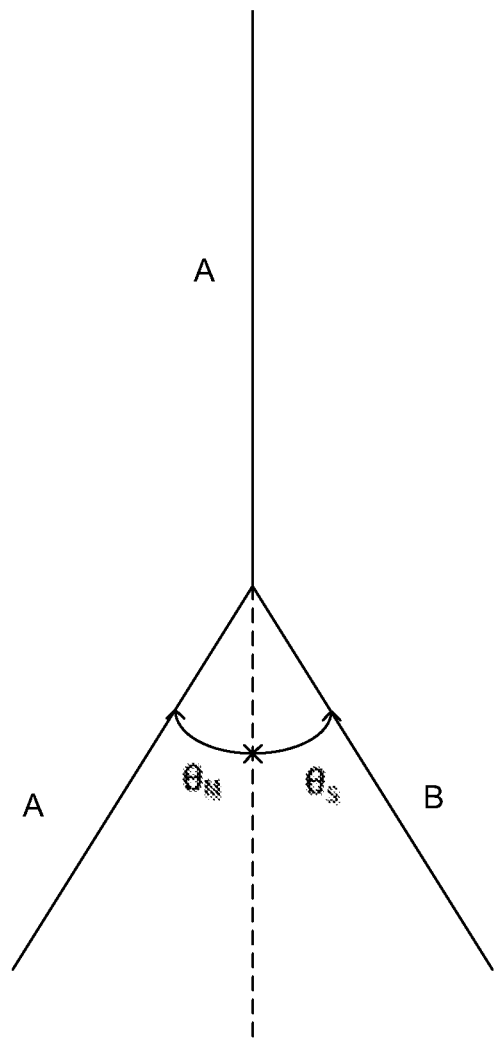
FIGS. 11b-c show simplified views showing main and branch conveyor paths of various embodiments of a conveyor system.

As described, the main conveyor path at about the junction is collinear. For example, the first and second main conveyor units 110a-b are configured to be in a linear alignment. In other embodiments, the main conveyor path may be non-collinear. For example, the first and second main conveyor units may not be linearly aligned. For example, the first and second main conveyor units may be disposed at an angle with respect to each other. This creates a non-linear path for conveyor path A, as shown in FIG. 11b. In this case, the second and secondary conveyor units may be disposed at angles $\theta_M$ and $\theta_S$, where the angles are less than the travel angle $\theta_1$. In such cases, the travel distance of the switch is angles $\theta_M + \theta_S$. For example, angles $\theta_M$ and $\theta_S$ may be about 25-45°. In one embodiment, the angles $\theta_M$ and $\theta_S$ are ≤about 25-45°. For example, the travel distance of the switch is ≤about 50-90°. Furthermore, in such cases, the end pulleys are not parallel in the home position. To maintain belt tracking, the first end pulley and or lower end pulley may be configured to be non-free rolling.

Figure 11C:
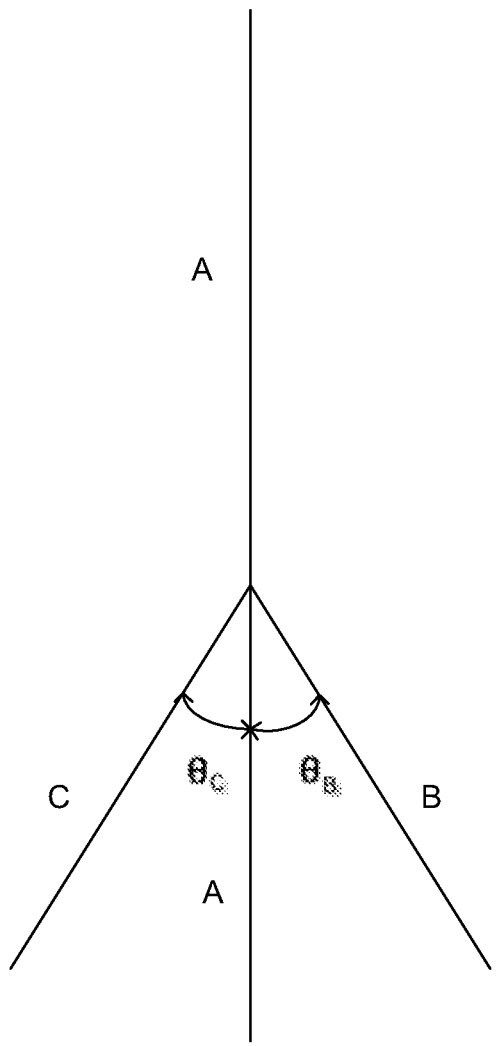

Also, as described, the conveyor system includes a main conveyor path and one secondary or branch conveyor path. Providing additional branch paths may also be useful. For example, the conveyor system may include a main conveyor path A and first and second branch paths B and C, as shown in FIG. 11c. In this case, second main conveyor unit may be linear with respect to the first main conveyor unit while the first and second branch conveyor units may be disposed at angles $\theta_B$ and $\theta_C$, where the angles are $\pm\theta_1$ with respect to the first main conveyor unit. Preferably, $\theta_B$ and $\theta_C$ are equal. In other embodiments, the second main conveyor unit may not be collinear with the first main conveyor unit. In this case, the second main and branch conveyors are configured so that none are more than $\pm\theta_1$ with respect to the first main conveyor unit. Depending on the configuration, the first end pulley may be freely rotatable except when in the non-home position. In other cases, the first end pulley may be fixed as non-rotatable.

Figure 12:
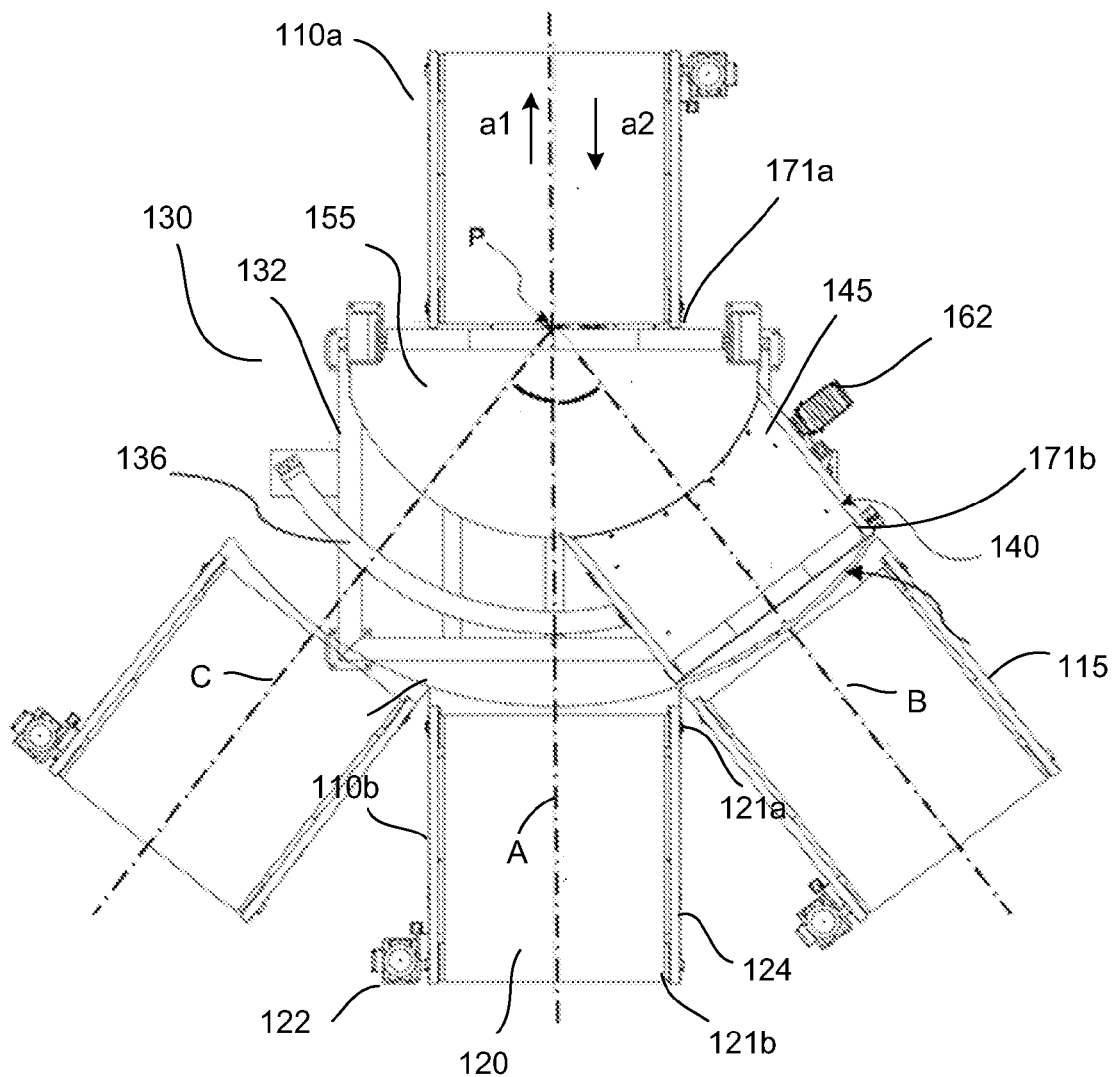
FIG. 12 shows another embodiment of a conveyor system.

FIG. 12 shows another embodiment of a conveyor system 102. As shown, the conveyor system includes a first or main conveyor path A and first and second branch conveyor paths B and C in which articles are translated, as depicted in FIG. 11c. The conveyor system is similar to that described in FIGS. 11a-b. Similar elements may not be described or described in detail.

The secondary conveyor paths form a junction with the first conveyor path. As shown, the first conveyor path is linear. The conveyor system may operate bi-directionally. For example, the conveyor system may operate in a first direction where the secondary paths merge into the main path, as indicated by arrow a1 or in a second direction where the main path may be diverted to the secondary paths, as indicated by arrow a2. The paths, along a direction of travel, form a travel angle $\theta_1$ of less than 45°.

Figure 13:
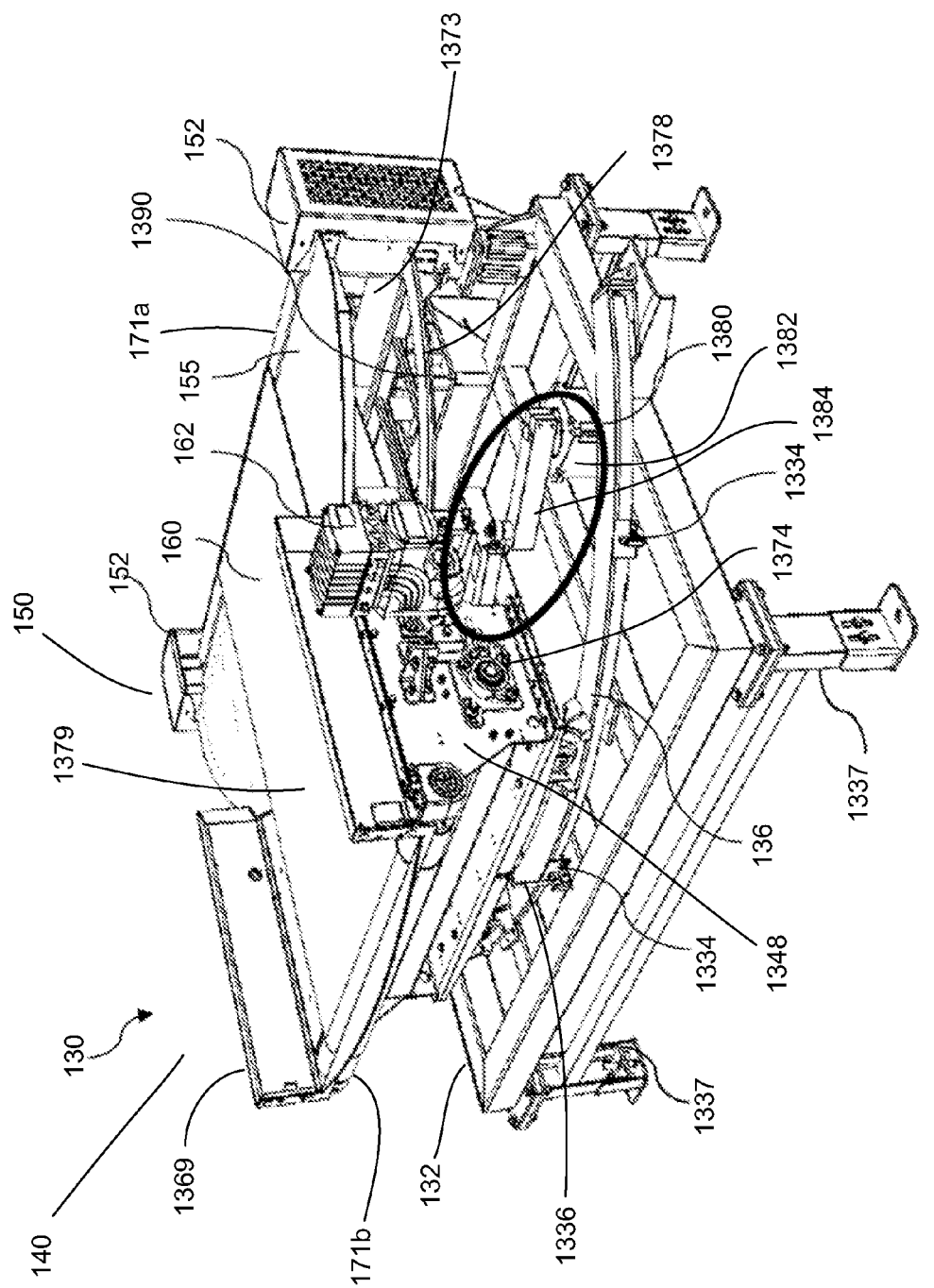
FIG. 13 shows an isometric view of an embodiment of a junction conveyor.

FIG. 13 shows an isometric view of an embodiment of a junction or distributing conveyor 130. The junction or distributing conveyor, for example, is similar to those described in FIGS. 11a-c and 12. Common elements may not be described or described in detail. The junction or distributing conveyor includes a base frame 132. The base frame supports the various components of the junction conveyor, including the stationary conveyor assembly, switching conveyor assembly 140, counter conveyor assembly 150 and translating unit 1380. The base frame, as shown is rectangular in shape. Other shapes may also be useful. The base frame should be sufficient to stably support the various components of the junction conveyor. For example, the base frame should be wider than the assemblies to stably support them.

The base frame includes support legs 1337 for supporting base frame. For example, the base frame includes four legs at each corner of the rectangular frame. The legs, in one embodiment, are adjustable legs. The legs facilitate or adjust to a height of the first and second sides of the junction conveyor to match that of the main and second main or secondary conveyor units. For example, the first side of the junction conveyor is on the same plane as the first main conveyor unit and the second side of the junction conveyor is on the same plane as the second main and secondary conveyor units. In a preferred embodiment, the conveyor units are on the same plane, for example, forming a horizon junction conveyor. In other embodiments, the first main conveyor unit may be on a different plane than the second main and secondary conveyor units.

The stationary conveyor assembly is disposed on the base frame. The stationary conveyor assembly includes a stationary support frame 152 mounted proximate to a first or stationary end of the base frame. The support frame is a vertical frame having first and second vertical sides which are maintained at a spatial distance apart. A first end pulley 171a is mounted on the vertical sides of the support frame. A lower end pulley 1373 is mounted on the vertical sides of the support frame. The lower end pulley is mounted on the vertical frame and below the first end pulley. In one embodiment, the first and lower end pulleys are parallel and in alignment with each other. The first and lower end pulleys are, for example long pulleys. The long pulleys are longer than the width of the junction conveyor surface. For example, the long pulleys are sufficiently long to provide sufficient space or accommodate the circular movement of the counter conveyor assembly. The first and lower end pulleys, in one embodiment, are covered with a low friction material. The low friction material, for example, may be a polytetrafluoroethylene-based material (PTFE). Other types of low friction materials may also be useful. Coating the first and lower end pulleys with low friction material reduces wear and heat due to dry sliding friction due to when the pulleys are not freely rotatable.

The counter conveyor assembly 150 is disposed adjacent to the stationary assembly. In one embodiment, the counter conveyor assembly includes a counter track 1378. The counter track is a semicircular track mounted on the vertical stationary support frame. The semicircular track, for example, is disposed below the first slider bed 155. The counter track serves to support the counter conveyor assembly. The counter conveyor assembly includes a counter bend pulley unit 1560. The counter bend pulley unit includes a counter bend pulley 1568 mounted on a counter bend support. In one embodiment, a counter bend pulley unit is slidably mounted on the counter track.

The main or switching conveyor assembly 140 is movably coupled to the base frame. The main conveyor assembly includes a main support frame 1348. A second end pulley 171b is mounted on the main support frame. Additionally, other pulleys of the pulley system are mounted on the main support frame. For example, a drive pulley 1476, take-up pulley 1374 and return pulley 1379 are mounted on the main support frame. A drive motor 162 is coupled to the drive pulley for rotating it. An endless belt 1379 loops around the pulleys of the pulley system and driven by the drive pulley. The endless belt forms a junction conveyor surface 160. The switching conveyor assembly may include side guards 1369 mounted on the sides of the switching support frame. The side guards prevent packages from moving off the junction conveyor surface.

In one embodiment, a main track 136 is mounted on the base frame. The switching conveyor assembly is slidably coupled to the main track. In one embodiment, the switching conveyor assembly is configured to move smoothly along the main track 136. The switching conveyor assembly pivots from a pivot point P by sliding on the tracks. The pivot point P, for example, is a pivot shaft.

A translating unit 1380 facilitates in moving the main conveyor assembly. For example, the translating unit includes a drive motor 1382 and a connecting drive linkage 1384 which are configured to move the main conveyor assembly. For example, the connecting drive linkage is coupled to the drive motor and main conveyor assembly for moving it. In one embodiment, the connecting drive linkage is a crank-rocker linkage. The crank-rocker linkage is configured to limit the travel distance of the switching conveyor assembly to what is necessary. For example, the crank linkage limits the travel distance of the main or switching conveyor assembly between 0-45° for a two-switching position. In the case of a three-switching position, the crank-linkage limits the travel distance of the conveyor to 0±45°. Limiting the conveyor assembly to other travel distances, depending on the design, may also be useful. By limiting the travel distance of the conveyor assembly, there is no risk of damage due to over-travel. Other types of linkages may also be useful. The drive motor is controlled by to a main junction conveyor controller. The controller, for example, is a programmable logic controller (PLC). Other types of controllers may also be useful.

The junction conveyor includes a sensor system having various sensors. In one embodiment, position sensors 1334 are provided on the main track 136. The position sensors indicate when the main assembly has reached the switch position. For example, the position sensor feeds back to the controller to stop the movement of the main conveyor assembly. The number of position sensors depends on, for example, the number of switch positions. For example, two sensors (e.g., home and switch positions) are provided in the case of two switch positions and three sensors for three switch positions (e.g., home and first and second switch positions). The sensors, for example, are photoelectric sensors. In one embodiment, the sensors may be U-shaped photoelectric sensors. A probe 1336 mounted on a center of the switching assembly. For example, when the infrared ray generated by a sensor is completely blocked by the probe, this indicates that the switching assembly is switched into position corresponding to the sensor. For example, if the home position sensor is blocked, this indicates that the switching assembly is in the home position. When the switching assembly has been switched into position other than the home position, the drive motor is stopped. In one embodiment, the sensors form a closed loop, enabling smoother and more accurate switching of the main assembly.

In one embodiment, the junction conveyor includes a CM module 1390. The CM module reduces vibration caused by moving the main conveyor assembly. The CM module is used to transmit the movement of the main conveyor assembly to the counter conveyor assembly oppositely and absorb the vibration and impact generated by the switching from one position to another. For example, the CM module causes the counter bend pulley unit to rotate at the pivot point P in a counter direction to the switching conveyor assembly to absorb the vibration and impact generated by the switching from one position to another. The pivot point P, in one embodiment, is a pivot shaft which is part of the CM unit. The CM module reduces the moment of inertia of the main conveyor assembly. The CM module enables high speed operation of the junction conveyor and increases reliability.

A braking unit may be provided to selectively stop the first end and/or lower end pulleys from freely rotating. Preferably, both first end and lower end pulleys are selectively braked. In one embodiment, the braking unit is provided on one of the pulleys. A timing unit with timing gears and belt may be used to synchronize the movement of the pulleys. For example, when one pulley is braked, the other is also braked. The braking unit is activated to stop the pulleys from rolling, in one embodiment, when the switching conveyor assembly is switched out of the home position. On the other hand, the brake is deactivated when the switching conveyor assembly is in the home position, allowing the pulleys to be free rolling. The braking unit, for example, may be controlled by the home position sensor. For example, when the home position sensor is blocked to indicate that the switching assembly is in the home position, the brake is deactivated. Conversely, when the home position sensor is unblocked, the brake is activated.

Figure 14:
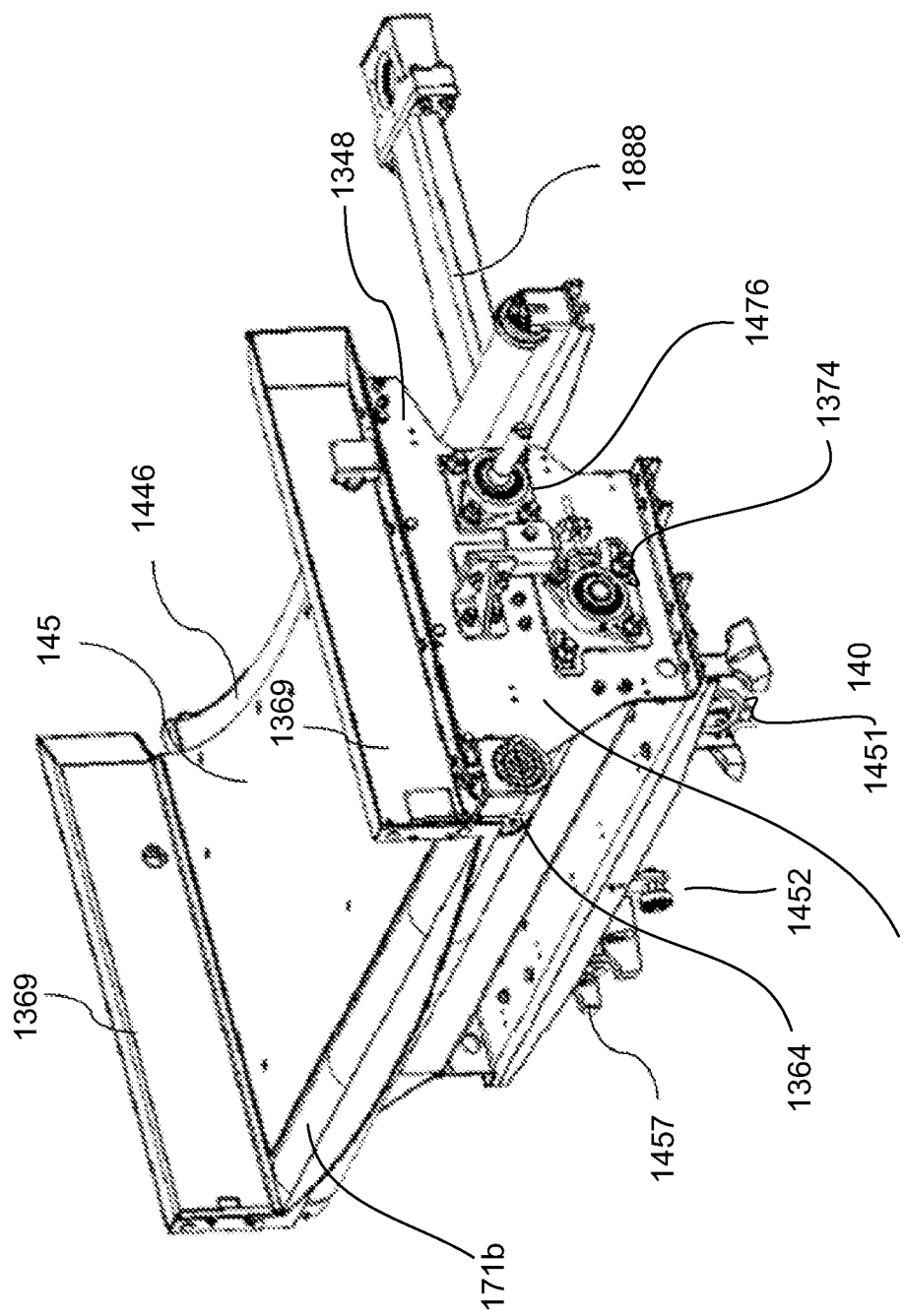
FIG. 14 shows an isometric view of an embodiment of a main conveyor assembly.

FIG. 14 shows an isometric view of an embodiment of a switching or main conveyor assembly 140. The switching conveyor assembly may be similar to that described in FIGS. 11-13. Common elements may not be described or described in detail.

As shown, the switching or main assembly includes a switching support frame 1348. The support frame includes a base with vertical plates 1449. Various pulleys of the main assembly are mounted on the base. In one embodiment, a second end pulley 171*b*, a take up pulley 1374, and a drive pulley 1476 are mounted on the vertical plates of the support frame. The second end pulley, along with the first end pulley and endless belt, define a conveying surface of the junction conveyor. In one embodiment, the pulleys are crown pulleys to enhance tracking of the endless belt. Crown pulleys are pulley which has the largest diameter at the middle and tapers towards the end. The pulleys, except for the drive pulley, are free rolling pulleys. The diameters of the pulleys may be selected appropriately to withstand the belt tension stress as well as for compactness. In addition, a return roller is mounted on the support frame. The return roller, for example, is used to prevent sagging of the endless belt. The pulleys and return roller are mounted in axially in parallel on the support frame. The take up pulley may be adjusted so that the endless belt can have the desired tension. An incremental encoder 1364 is coupled to the second end pulley. The second end pulley, for example, represents a switching end of the junction conveyor.

A second slider bed 145 is mounted on the vertical plates disposed below the plane of the endless belt. The second slider bed is disposed below and in a parallel plane of the belt. The second slider bed 145 serves to support articles on the conveyor surface. The second slider bed includes a semicircular end 1446 which is configured to slidably mate with the first slider bed 155 mounted on the vertical frame. Side guards 1369 may be mounted to the vertical plates 1449.

The switching support frame includes a yoke portion 1888 and mount at non-switching end. The yoke, for example, extends under the counter conveyor assembly. The mount at the end of the yoke includes a main conveyor support bearing unit. The mount is mated to a pivot shaft disposed on the base frame of the junction conveyor. The pivot shaft, for example, forms a pivot point of the switching conveyor assembly. The switching conveyor assembly rotates freely around the pivot shaft, serving as the pivot point P. At the switching end of the support, a transport system is provided. The transport system facilitates movement of the switching conveyor assembly on the main track. In one embodiment, the transport system includes load caster wheels 1451 mounted on the support for free rolling on the main track. The load castor wheels support movement of the switching conveyor assembly on the main track. Additionally, safety wheels 1452 are provided. The safety wheels prevent tilting of the switching conveyor assembly on the track. For example, the safety wheels run underneath the track. The transport system may include sweepers 1457 mounted on the main base and positioned to clear contaminants off the main track. The sweepers, for example, may be formed of wear resistance material, such as Teflon or nylon. Other types of materials may also be useful. The sweepers ensure smooth and safe rotation of the switching conveyor assembly.

Figure 15:
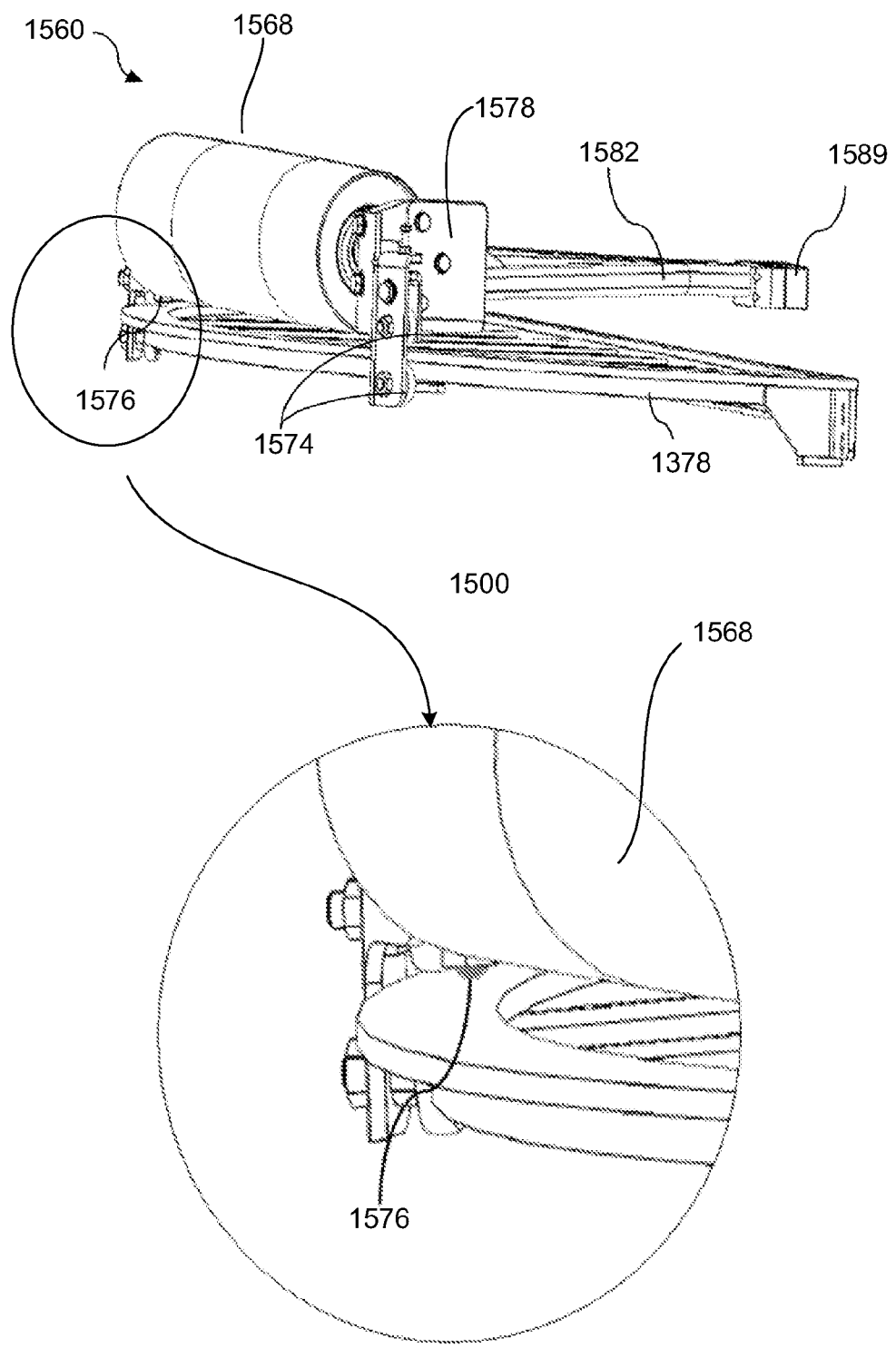
FIG. 15 shows an embodiment of a portion of a counter conveyor assembly.

FIG. 15 shows an embodiment of portion 1500 of a counter conveyor assembly 150. As shown, the portion includes a counter bend pulley unit 1560. The counter bend pulley unit includes a bend pulley support 1582. The bend pulley support includes slidable pulley mounts 1578 which a counter bend pulley 1568 is mounted. The bend pulley, in one embodiment, is a crown pulley. Other types of bend pulleys may also be useful. The slidable mount includes bearings 1574 disposed thereon. The bearings facilitate mating to the counter track 1378. The bearings, for example, may be urethane mode bearings. Other types of bearings may also be useful. A mount, for example includes top and bottom bearings symmetrically arranged to facilitate rolling on the counter track. The bearings guide the counter bend pulley unit along the counter track with balanced support and small driving force during rotation. In one embodiment, ball casters 1576 may be provided on the mounts as a back-up due to wearing out of the bearings. This prevents unexpected tilting or leaping of the bend pulley unit.

The bend pulley support includes a clamp block 1589 at an opposite end of the pulley mounts. The clamp block, for example, serves as a pivot point for the counter bend pulley unit. For example, the clamp block is fixed to the pivot point P for rotating the counter bend pulley unit around it. In one embodiment, the counter bend pulley rotates in a counter direction to the switching assembly. In one embodiment, the amount of counter rotation is equal to rotation of the switching assembly.

Figure 16:
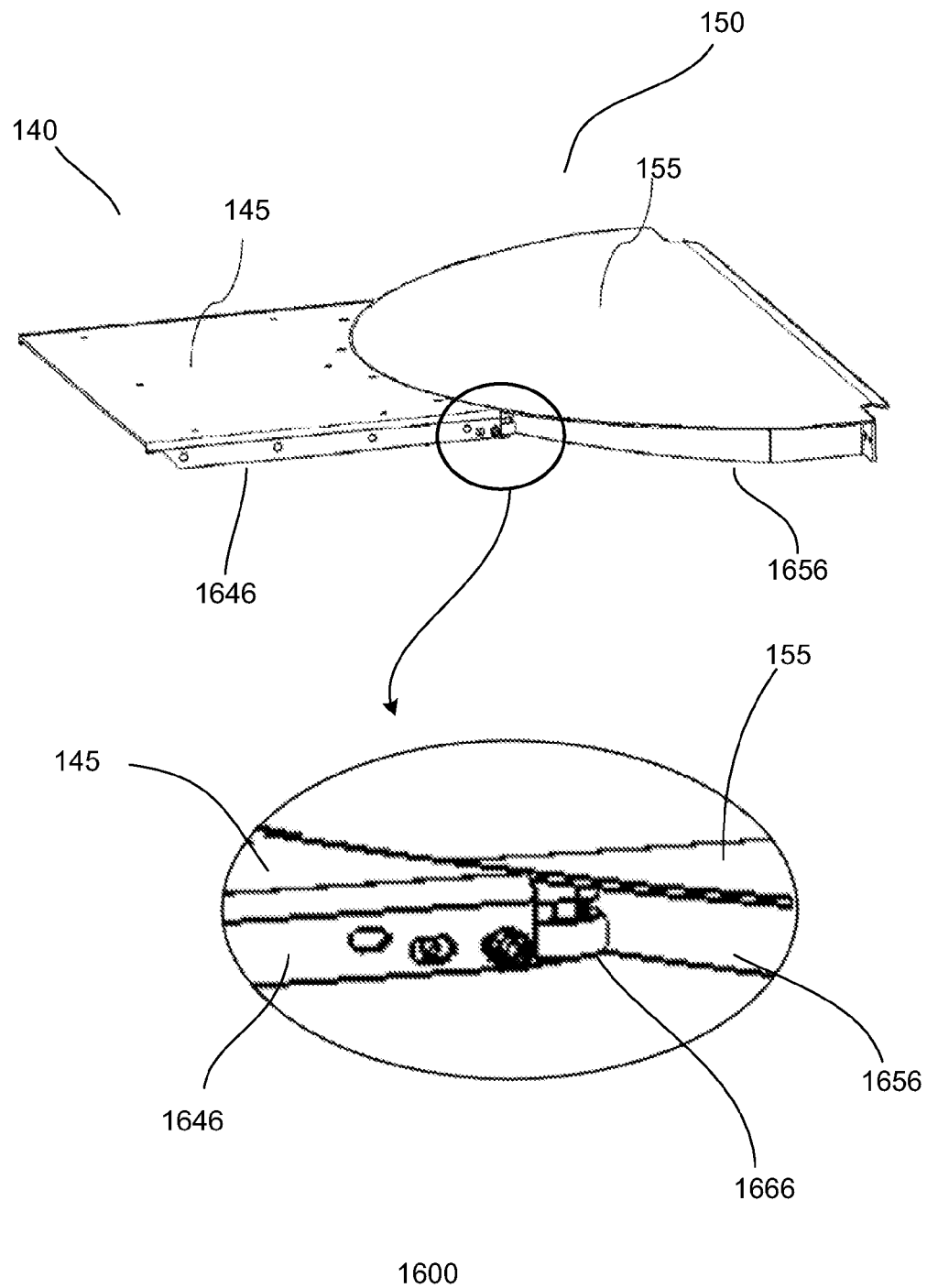
FIG. 16 shows an embodiment of a slider bed arrangement.

FIG. 16 illustrates slider bed arrangement 1600. As shown, the arrangement includes a first slider bed 155 mounted on the vertical frame. The first slider bed includes a first slider bed frame 1656 on which the first slider bed is mounted. The outer side of the slider bed frame, for example, may serve as a slider track. The first slider bed 155 has a semicircular shape. As for the switching assembly, it includes a second slider bed 145. The second slider bed is disposed on a second slider bed frame 1646. The second slider bed and frame form an integrated unit which is mounted onto the switching support frame.

The slider beds have semicircular shapes. For example, the first slider bed 155 has a convex semicircular shape while the second slider bed 145 has a concave semicircular shape. The second slider bed is slidably coupled to the first slider bed. In one embodiment, the second slider bed frame is provided with transporters for facilitating slidable coupling of the second slider bed around the first slider bed frame. The transporters, in one embodiment, include guide castors mounted on the second slider frame. For example, first and second guide castors 1666 are provided near the sides of the slider bed. The caster wheels enable the second slider bed to slide smoothly around the first slider bed frame. Other types of transporters may also be useful. In one embodiment, a semicircular plate is provided at the bottom of the semi-circular edge of the second slider bed. The plate, for example, may be formed of a light and high wear resistance material soft material, such as UHMW, steel or aluminum. Other types of wear resistance soft materials may also be useful. The plate reinforces the cantilever structure of the semi-circular slider bed and reduces material deformation and fatigue failures.

Figure 17:
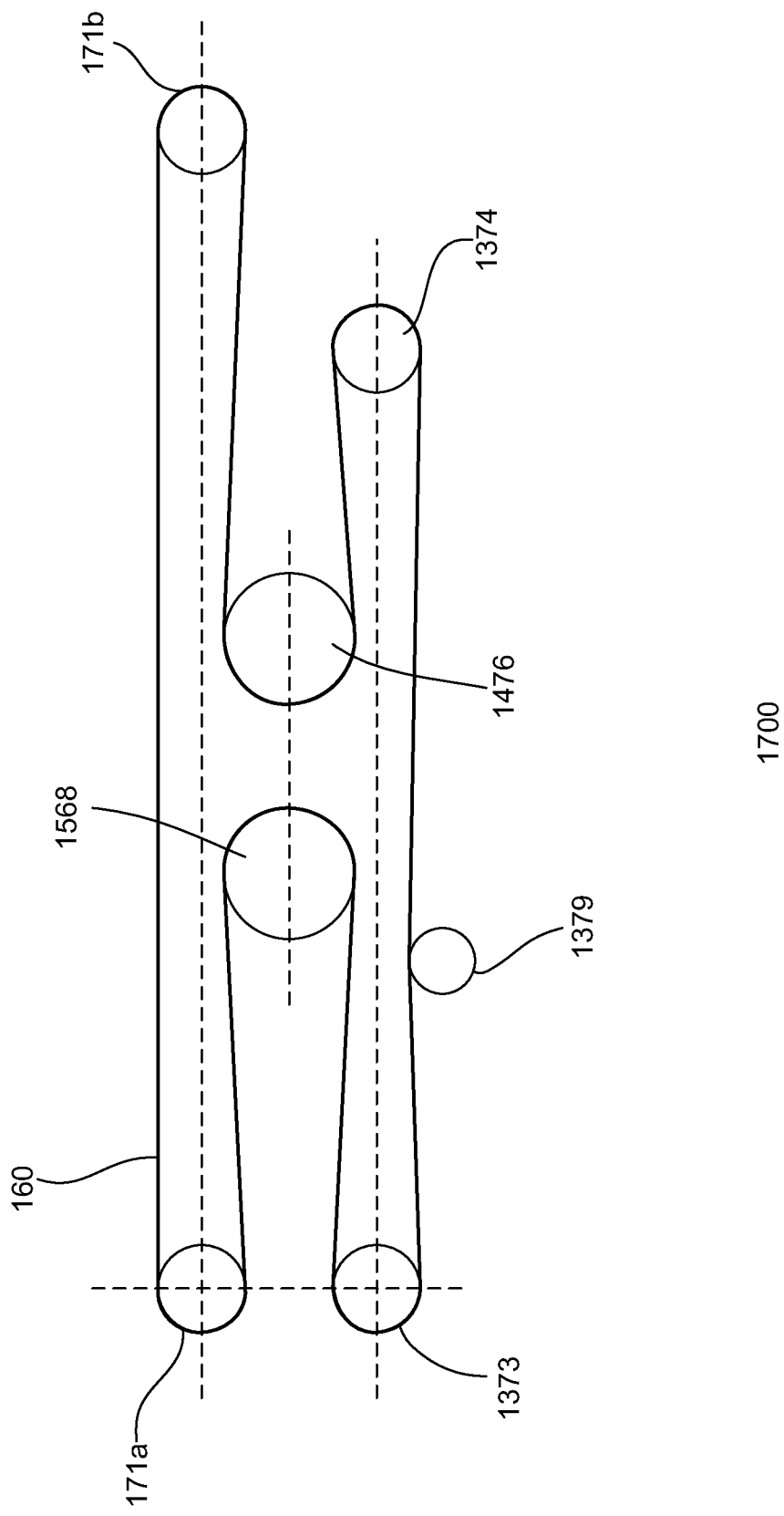
FIG. 17 shows a simplified perspective view of an embodiment of a pulley system.

FIG. 17 shows a simplified perspective view of an embodiment of a pulley system 1700. In one embodiment, the pulley system includes a first end pulley 171*a*, a lower end pulley 1373, a counter bend pulley 1568, a second end pulley 171*b*, a take up pulley 1374 and return roller 1379. The end pulleys and take up pulley, as shown, are of a first diameter and the bend pulley and drive pulley 1476 are of a second diameter. For example, the first diameter is smaller than the second diameter. The size of the pulleys, for example, is selected based on stress, wear and compactness. Providing other configurations of pulley sizes may also be useful.

In one embodiment, the first end and lower end pulleys are mounted on the vertical frame. In one embodiment, the first end and lower end pulleys are mounted in the same vertical plane. The vertical plane, for example, is perpendicular to the horizontal frame formed by, for example, the floor. These pulleys, as previously discussed, are long pulleys coated with low friction material. The long pulleys should be sufficient long, for example, to accommodate the circular movement of the counter conveyor assembly. As for the counter bend pulley, it forms part of the counter conveyor assembly. The bend pulley is disposed between the horizontal planes of the first end and lower end pulleys and displaced away from the end pulleys.

As for the remaining pulleys including the return roller, they are mounted on support frame of the switching conveyor assembly. In one embodiment, the second end pulley 171*b* is disposed on the same horizontal plane as the first end pulley 171*a* and forms the junction conveyor surface, the drive pulley is disposed on the same horizontal plane as the bend pulley and the take up pulley is disposed on the same horizontal plane as the lower end pulley. As for the return roller is it disposed below the horizontal plane of the lower end and take up pulley.

An endless belt routs around the pulleys of the pulley system. The first and second end pulleys define the conveyor surface 160 of the junction conveyor. In one embodiment, the belt includes top and bottom sides. The top side is made of flexible PVC to provide high friction for the belt driving and article transport while the bottom side is formed of a material with low friction. In one embodiment, the belt is routed such that the top side of the belt forms the conveyor surface and wraps around the drive pulley to obtain good belt-friction-drive performance. In one embodiment, the wrapping angle β is greater or equal to 180°.

In one embodiment, the drive pulley, take up pulley, counter bend pulley and second end pulley are crown pulleys to facilitate belt tracking. Additionally, plastic disks may be provided on ends of the drive pulley, take up pulley and return roller to facilitate guiding the belt to prevent it from wandering.

Figure 18A:
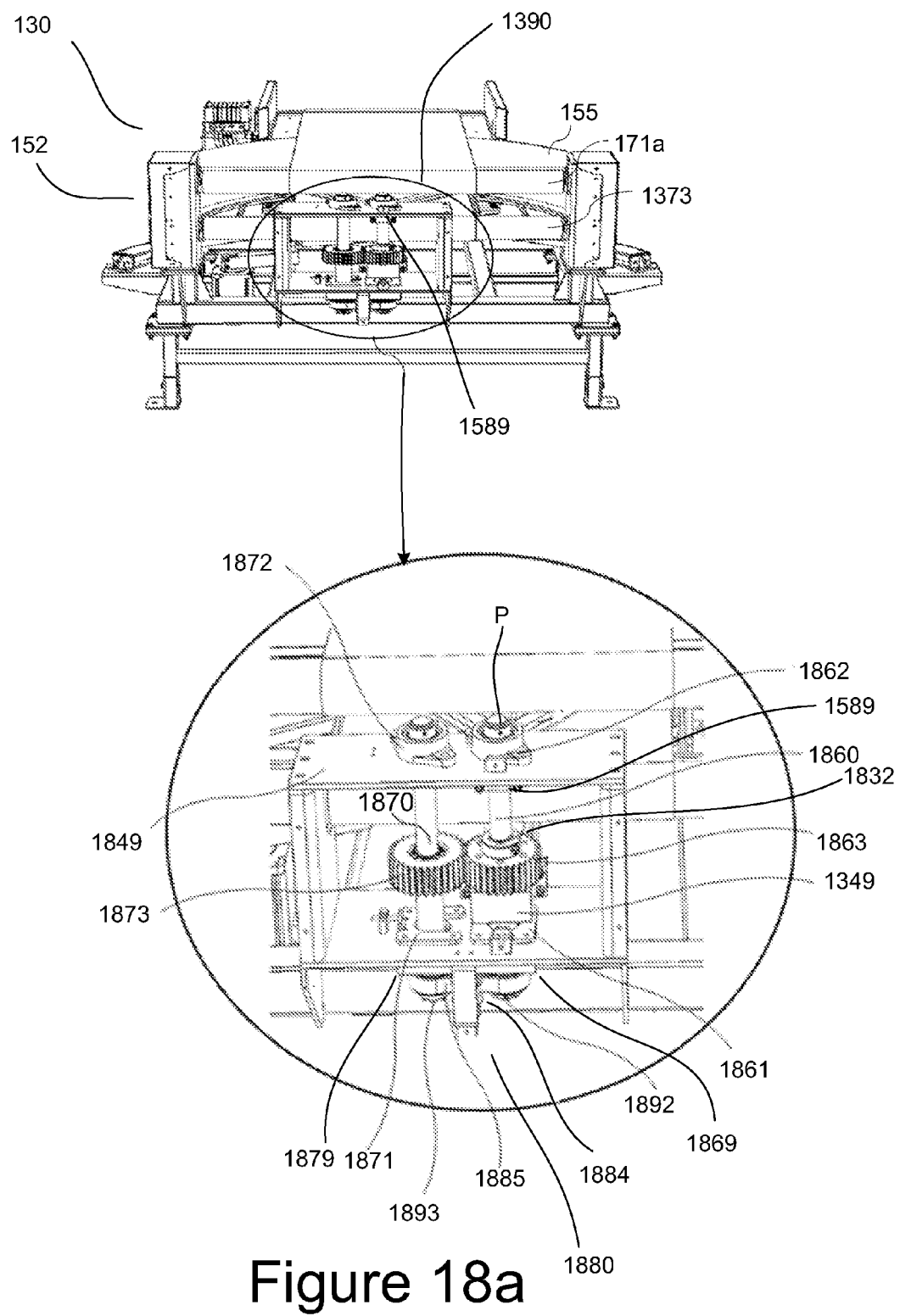
FIG. 18a-b show back and side perspective views of an embodiment of the junction conveyor.
Figure 18B:
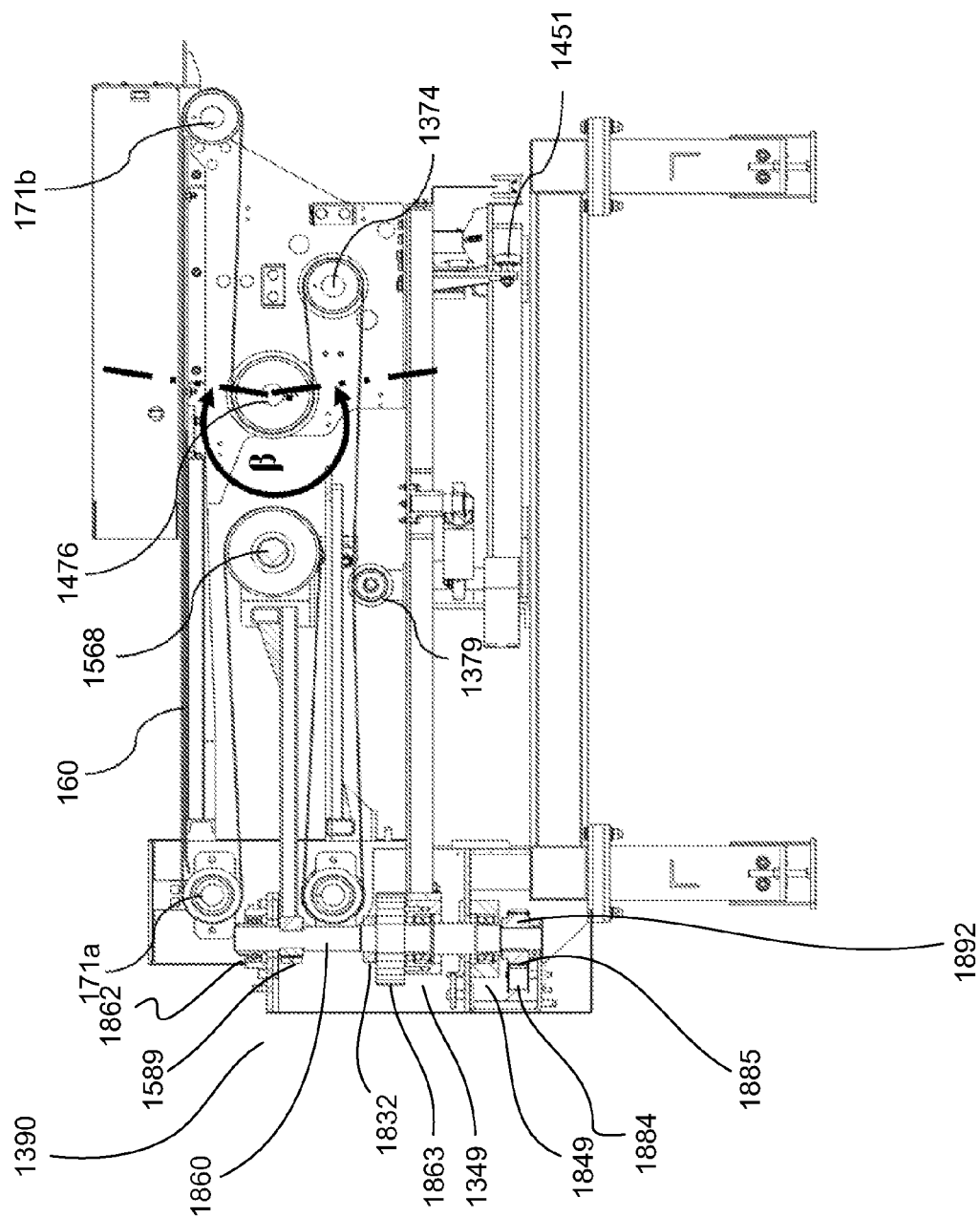

FIG. 18*a-b* show back and side perspective views of an embodiment of the junction conveyor 130. The junction conveyor includes similar elements described in FIGS. 11-17. Common elements may not be described or described in detail. As shown, the junction conveyor includes first and lower end long pulleys 171*a* and 1373 mounted on a stationary end. In one embodiment, the long pulleys are mounted on a vertical support frame 152 disposed proximate to the stationary end of the base frame. A CM unit 1390 is disposed on the base frame. The CM unit is disposed at the stationary end of the base frame. In one embodiment, the CM unit includes a housing 1849 mounted on the base frame.

In one embodiment, the CM unit includes a gear unit. The gear unit includes first and second shafts 1860 and 1870. First and second top bearings 1862 and 1872 are mounted on a top housing panel and first and second bottom bearings 1869 and 1879 are mounted on a bottom housing panel. The bearings, for example, are mounted on an outer surface of the housing panel. The first top and bottom bearings are vertically aligned while the second top and bottom bearings are vertically aligned. In one embodiment, the top bearings are flanged bearings while the bottom bearings are double-row angular contact bearings. Other types of bearings may also be useful. The first shaft extends through the first top and bottom bearings and the second shaft extends through the second top and bottom bearings. The shafts are freely rotatable and held in position by the bearings. The use of flange bearings advantageously provides self-alignment function. For example, the bearings can sufficiently compensate shaft eccentricity due to installation tolerance as well as bending deformation due to inertia and centrifugal force during switching.

The shafts extend through the top and bottom panels. First and second top bearings 1862 and 1872 are used to mount the shafts to the top housing panel. The top bearings, for example, are flange bearings which are mounted on the top housing panel and hold the shafts in position. For example, top ends of the first and second shafts extend through the first and second flange bearings and locked in position. Other types of bearings may also be useful. At the bottom of the shaft, bottom bearings are mounted on the bottom housing panel and hold the shafts in position. For example, the bottom bearings are mounted to a bottom side of the bottom housing panel. In one embodiment, the first shaft serves as the pivot point P while the second shaft is the reverse shaft.

The first shaft includes a first gear 1863 and the second shaft includes a second gear 1873. The gears, for example, are spur gears which are fitted together. Other types of gears may also be useful. In one embodiment, the first gear includes a gear bearing 1832 inside. This bearing holds the gear in position and enables it to freely rotate around the first shaft. The main conveyor support bearing 1349 is mounted on the first shaft. The support bearing freely rotates around the shaft. In one embodiment, the main support bearing is fixed to the first gear. As shown, the main support bearing is disposed below the first gear. Rotation of the main assembly causes the first gear to rotate around the first shaft. The rotation may be clockwise or counter-clockwise, depending on the direction of switching. In one embodiment, the first and second gears have a gear ratio of 1:1. Providing other gear ratios may also be useful.

In one embodiment, the clamp block 1589 of the counter conveyor assembly is fixably mounted on the first shaft. For example, the clamp block is clamped to the shaft below the inner surface of the top housing panel. The clamp block rotates with the rotation of the first shaft. As for the second gear, it is fixed to the second shaft. In other words, the second shaft rotates with the second gear.

First and second shaft position adjustment guides 1861 and 1871 are provided on the bottom housing panel. In one embodiment, the adjustment guides are provided on the inner surface of the bottom housing panel. The adjustment guides, for example, are used to finely adjust shaft position of the first and second shafts. In one embodiment, the first adjustment guide provides fine adjustment of the pivot shaft to maintain proper belt deformation and tracking while the second adjustment guide is used to finely adjust the center distance between the two gears to ensure correct teeth engagement with minimal wear and tear as well as mechanical impact and backlash.

A timing unit 1880 is provided in the CM unit. The timing unit includes timing gears or pulleys and a timing belt to synchronize movement of the different components of the CM unit. In one embodiment, the timing unit includes first and second timing gears or pulleys 1892 and 1893 on bottom ends of the first and second shaft proximate to the bottom housing panel. The timing gears are fixably mounted on the shafts. A timing belt 1885 is fitted around the timing gears. A timing adjustment pulley 1884 is provided for adjusting the tension of the timing belt. The timing adjustment pulley, for example, is disposed on a mount attached to the bottom housing panel. In one embodiment, the timing gears and belt are toothed.

During switching, the rotation of the main or switching conveyor assembly causes the first gear to rotate in a first direction. Depending on the direction of switching, the first direction may be clockwise or counter-clockwise. Rotation of the first gear engages the second gear to rotate in a second and opposite direction. For example, if the first gear rotates in a clockwise direction, the second gear rotates in a counter-clockwise direction. Rotation of the second gear causes the second shaft to rotate along with it. Due to the timing pulleys and belt, the first shaft is caused to rotate in the same direction as the second shaft. In other words, the shafts rotate in the same direction or in reverse direction as the first gear. This results in the counter bend pulley unit to rotate in the reverse direction as the switching conveyor assembly. Furthermore, the timing belt absorbs some impact and vibration generated from inertial force due to its flexibility.

Figure 19:
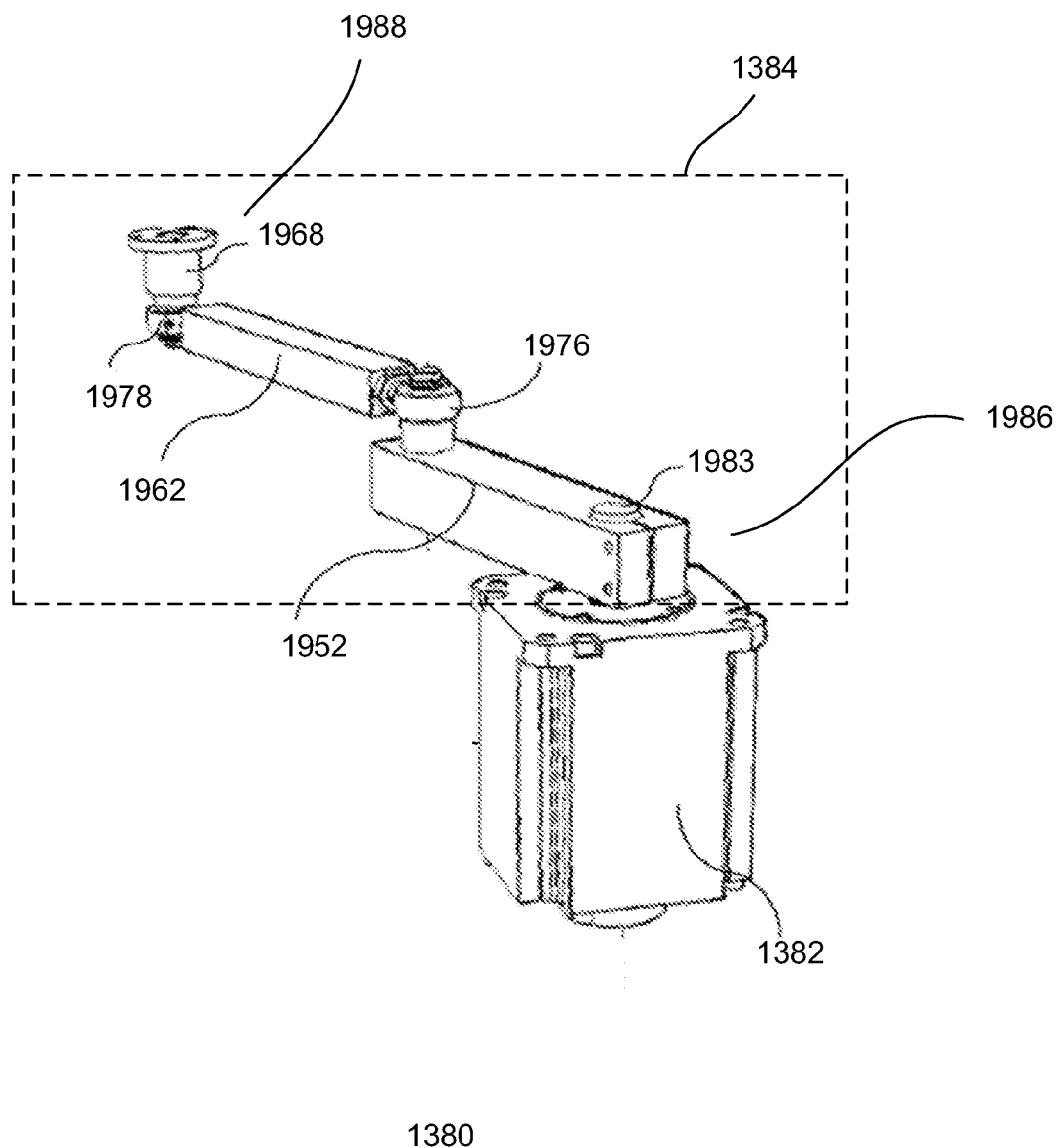
FIG. 19 shows an embodiment of a translating unit.

FIG. 19 shows an embodiment of translating unit 1380. The translating unit includes a drive motor 1382. Any suitable type of drive motor may be used. The motor should be sufficient to switch the switching conveyor assembly. The motor, in one embodiment, is capable of rotating in a first direction and in a second opposite direction. For example, the motor can be controlled to rotate in the clockwise or counter clockwise direction.

The motor is coupled to a connecting drive linkage 1384. In one embodiment a first end 1986 of the connecting drive linkage is coupled to a shaft 1983 of the motor while a second end 1988 of the connecting drive linkage is coupled to the switching conveyor support to move it. In one embodiment, the connecting drive linkage is a crank-rocker linkage. The crank-rocker linkage is a four bar linkage device.

In one embodiment, the four bar linkage includes 2 physical bars and 2 virtual bars. The first physical bar is a first connecting arm 1952 having a first end fixably connected to the shaft of the drive motor. The first connecting arm, for example, serves as a crank. The second physical bar is a second connecting arm 1962. A first end of the second connecting arm is coupled to the second end of the first connecting arm by a first coupler 1976. The second connection arm rotates around an axis parallel to the drive motor shaft. For example, the first and second arms rotate in parallel planes. A second end of the connecting arm is coupled to switching conveyor assembly. In one embodiment, a shaft holder 1968 is provided at the second end of the connecting arm for coupling to the switching conveyor assembly. The shaft holder is coupled to the second end by a second coupler 1978. The shaft holder is rotatable around the second coupler. The first and second couplers are, for example, rod end bearings. A coupler includes a male and female rod end bearing which are mated together to form the movable couplings between physical elements of the connecting drive linkage. Other types of couplers may also be useful.

The third bar is a virtual bar. The third bar, in one embodiment, is represented by the virtual line connecting the center point of the shaft holder to the pivot point P. The third bar, for example, serves as the rocker. The fourth bar, like the third bar, is a virtual bar. The fourth bar corresponds to a virtual fixed base frame link which connects the center of the motor shaft to the pivot point P.

The length and kinematic parameters of each linkage, such as angular displacement, angular velocity and angular acceleration can be determined to produce the correct movement range. In one embodiment, one complete rotation (e.g., 360°) causes the switching assembly to move from a first position to a second position and back to the first position. For example, from home position to switch position and back to home position. What this means is that a half rotation (e.g., 180°) causes the switching conveyor assembly to move form a first position to a second position. In the case of a junction conveyor with a home and two switch positions, rotating the motor in a first direction for one revolution will cause the switching assembly to switch from, for example, home to a first switch position and back to home position while in the second direction, will switch from home to a second switch position and back to home.

Although the one or more above-described embodiments and implementations have been described in language specific to structural features and/or methodological steps, it is to be understood that other embodiments and implementations may be practiced without the specific features or steps described. Rather, the specific features and steps are disclosed as preferred forms of one or more embodiment and implementation.

What is claimed is:

1. A junction conveyor comprising:
a base frame;
a stationary end and a switching end for switching from a home position to a switch position;
a main conveyor assembly;
a counter conveyor assembly;
a gear unit attached to the base frame, wherein the gear unit comprises a rotatable first gear engaging a rotatable second gear that enables the movement of the main conveyor assembly and the counter conveyor assembly, wherein the main conveyor and counter conveyor assemblies are pivotally connected to the gear unit, wherein the gear unit enables, via the pivotal connections, the main conveyor assembly and the counter conveyor assembly to move in opposition to each other; and
a motorized drive unit, wherein the motorized drive unit causes the counter conveyor assembly to move in an opposite direction as the main conveyor assembly during switching from the home position to the switch position.

2. The junction conveyor of claim 1 wherein:
the main conveyor and counter conveyor assemblies are mounted to the base frame; and
the base frame comprises a first end adjacent to the stationary end and a second end adjacent to the switching end of the junction conveyor.

3. The junction conveyor of claim 2 comprises a pulley system through which a conveyor belt loops to form a junction conveyor surface.

4. The junction conveyor of claim 3 wherein:
the pulley system comprises first and lower end pulleys, wherein the first end pulley defines the stationary end of the junction conveyor;
the main conveyor assembly comprises first and second vertical support frames mounted to the base frame which are maintained at a fixed spatial arrangement, wherein the first and lower end pulleys are mounted to the vertical support frames.

5. The junction conveyor of claim 3 wherein the counter conveyor assembly comprises a counter bend pulley unit, a counter track and a clamp block, wherein the counter bend pulley unit is rotatable around a pivot point P located at the stationary end of the junction conveyor at about the center of the junction conveyor surface.

6. The junction conveyor of claim 5 comprises a switching track, wherein the main conveyor assembly is slidably coupled to the switching track.

7. The junction conveyor of claim 6 comprises position sensors mounted on the switching track to indicate when the main conveyor assembly has reached the switch position.

8. The junction conveyor of claim 7 wherein:
the gear unit comprises first shaft having the rotatable first gear and second shaft having the rotatable second gear; and comprising
a connection mechanism that synchronizes rotational movement of the first and second shafts, wherein the connection mechanism comprises a timing unit having first and second timing gears mounted on the shafts and a timing belt fitted around the timing gears, wherein the timing gears and belt are configured to cause the first shaft to rotate in the same direction as the second shaft.

9. The junction conveyor of claim 1 wherein the motorized drive unit is a gear drive unit having a switching drive motor, a gearbox, an arc gear with arc sprocket and a sprocket.

10. The junction conveyor of claim 9 wherein:
the switching drive motor is mounted on the base frame;
the gearbox is attached to the switching drive motor;
the arc gear is disposed under the main conveyor assembly; and
movement of the main conveyor assembly is driven by operation of the switching drive motor via the sprocket which engages the arc sprocket on the arc gear.

11. The junction conveyor of claim 1 wherein:
the gear unit comprises first shaft having the rotatable first gear and second shaft having the rotatable second gear; and comprising
a connection mechanism that synchronizes rotational movement of the first and second shafts, wherein the connection mechanism comprises a plurality of flanged mounted bearings, an eye-turned buckle, and first and second welded plates, wherein the welded plates are joined by the eye-turned buckle and are configured to cause the first shaft to rotate in the same direction as the second shaft.

12. The junction conveyor of claim 1 wherein the motorized drive unit comprises a translating unit having a drive motor and a connecting drive linkage.

13. The junction conveyor of claim 12 wherein the connecting drive linkage comprises a crank-rocker linkage having a four-bar linkage device.

14. The junction conveyor of claim 13 wherein the four bar linkage device includes first and second physical bars and two virtual bars, wherein the first physical bar having a first end fixably mounted to a shaft of the drive motor and the second physical bar having a first end coupled to the first physical bar and a second end coupled to the main conveyor assembly.

15. The junction conveyor of claim 1 wherein the motorized drive unit is a belt drive unit having a gearbox, a switching drive motor, first and second drive pulleys, a timing belt, a connection block and first and second linear rails.

16. The junction conveyor of claim 15 wherein:
the gearbox is attached to the switching drive motor and the gearbox and the switching drive motor are mounted on the base frame;

the first and second pulleys are mounted on the base frame and one of the first and second pulleys is connected to and driven by the switching drive motor and gearbox;

the timing belt is looped around the first and second drive pulleys with the connection block attached on the timing belt;

the first linear rail is mounted on the base frame and is positioned parallel with section of the timing belt between the pulleys; and the second linear rail is attached under the upper movable frame, wherein the connection block is slidably attached to the first and second linear rails.

17. A belt conveyor system comprising:

a main conveyor unit, a second main conveyor unit and a secondary conveyor unit, wherein the secondary conveyor unit is disposed at an angle θ1 with respect to the main conveyor unit, and wherein the main and the second main conveyor unit form a main conveyor path and the main and the secondary conveyor unit forms a secondary path; and a junction conveyor disposed at a junction between the main and secondary conveyor paths, wherein the junction conveyor comprises a stationary end and a switching end, a main conveyor assembly, a counter conveyor assembly, a gear unit attached to the base frame, wherein the gear unit comprises a rotatable first gear engaging a rotatable second gear that enables the movement of the main conveyor assembly and the counter conveyor assembly, wherein the main conveyor and counter conveyor assemblies are pivotally connected to the gear unit, wherein the gear unit enables, via the pivotal connections, the main conveyor assembly and the counter conveyor assembly to move in opposition to each other, and a motorized drive unit, wherein the motorized drive unit causes the counter conveyor assembly to move in an opposite direction as the main conveyor assembly during switching from the main conveyor path to the secondary path.

18. The belt conveyor system of claim 17 wherein:

the gear unit comprises first shaft having the rotatable first gear and second shaft having the rotatable second gear; and comprising a connection mechanism that synchronizes rotational movement of the first and second shafts, wherein the connection mechanism comprises a timing unit comprises first and second timing gears mounted on the shafts and a timing belt fitted around the timing gears, wherein the timing gears and belt are configured to cause the first shaft to rotate in the same direction as the second shaft.

19. The belt conveyor system of claim 17 wherein the motorized drive unit comprises a translating unit having a drive motor and a connecting drive linkage.

20. The belt conveyor system of claim 19 wherein the connecting drive linkage comprises a crank-rocker linkage having a four-bar linkage device.

21. A junction conveyor comprising:

a base frame;

a main conveyor assembly;

a counter conveyor assembly;

a gear unit attached to the base frame, wherein the gear unit comprises a main shaft, wherein the main conveyor and counter conveyor assemblies are pivotally connected to the main shaft of the gear unit, the main shaft of the gear unit serves as a pivot point for movement of both assemblies and the gear unit enables the main conveyor and counter conveyor assemblies to pivot in opposite directions; and a motorized drive unit, wherein the motorized drive unit causes the counter conveyor assembly to move in an opposite direction as the main conveyor assembly during switching from a first position to a second position.

22. The junction conveyor of claim 21 wherein the motorized drive unit is a gear drive unit.

23. The junction conveyor of claim 21 wherein the motorized drive unit is a belt drive unit.

24. The junction conveyor of claim 21 wherein the motorized drive unit is a translating unit having a drive motor and a connecting drive linkage.

25. The junction conveyor of claim 21 comprising a switching track attached to the base frame, wherein the main conveyor assembly comprises at least one wheel which enables movement of the main conveyor assembly on the switching track.

26. The junction conveyor of claim 21 comprising a guide track attached to the base frame, wherein the counter conveyor assembly comprises at least one wheel that guides movement of the counter conveyor assembly along the guide track.

* * * * *